US012592819B2

(12) United States Patent　　　(10) Patent No.:　US 12,592,819 B2
Osborn et al.　　　　　　　　　　 (45) Date of Patent:　　Mar. 31, 2026

(54) MEMBERSHIP ACCOUNT MANAGEMENT USING A CONTACTLESS CARD

(71) Applicant: Capital One Services, LLC, McLean, VA (US)

(72) Inventors: Kevin Osborn, Newton Highlands, MA (US); Srinivasa Chigurupati, Long Grove, IL (US)

(73) Assignee: Capital One Services, LLC, McLean, VA (US)

( * ) Notice: Subject to any disclaimer, the term of this patent is extended or adjusted under 35 U.S.C. 154(b) by 164 days.

(21) Appl. No.: 18/115,199

(22) Filed: Feb. 28, 2023

(65) Prior Publication Data

US 2024/0291648 A1　　　Aug. 29, 2024

(51) Int. Cl.
　　*H04L 29/06*　　　　(2006.01)
　　*G06K 7/10*　　　　(2006.01)
　　*H04L 9/08*　　　　(2006.01)

(52) U.S. Cl.
　　CPC .......... *H04L 9/088* (2013.01); *G06K 7/10366* (2013.01)

(58) Field of Classification Search
　　CPC . H04L 9/088; H04L 2209/56; G06K 7/10366; G07F 7/122; G06Q 20/341
　　See application file for complete search history.

(56) References Cited

U.S. PATENT DOCUMENTS 4,683,553 A　　7/1987　Mollier
4,827,113 A　　5/1989　Rikuna
4,910,773 A　　3/1990　Hazard et al.

(Continued)

FOREIGN PATENT DOCUMENTS

CA　　　3010336 A1　　7/2017
CN　　101192295 A　　6/2008

(Continued)

OTHER PUBLICATIONS

The International Search Report and Written Opinion mailed May 20, 2024, for corresponding PCT/US24/16118 (nine (9) pages).

(Continued)

*Primary Examiner* — Yogesh Paliwal

(74) *Attorney, Agent, or Firm* — KDW Firm PLLC

(57)　　　　　　　ABSTRACT

Systems, methods, apparatuses, and computer-readable media for management of membership functions for members of a partner entity associated with contactless card cryptograms are described. For example, a method may include receiving a membership cryptogram generated by a contactless card in communication with the client device during a transaction, the contactless card associated with at least one partner entity having a plurality of members, decrypting the membership cryptogram based on at least one master key for the contactless card to determine a decryption result, authenticating the membership cryptogram based on the decryption result; and responsive to authentication of the membership cryptogram: determining a membership identifier for the transaction, determining a member of the plurality of members based on the membership identifier, and transmitting membership benefit information to the client device to facilitate at least one membership function associated with the member for the transaction. Other embodiments are described.

20 Claims, 14 Drawing Sheets

(56) References Cited

U.S. PATENT DOCUMENTS

| | | | |
|---|---|---|---|
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,590,038 | A | 12/1996 | Pitroda |
| 5,592,553 | A | 1/1997 | Guski et al. |
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,572,015 | B1 | 6/2003 | Norton |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,252,242 | B2 | 8/2007 | Ho |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,527,208 | B2 | 5/2009 | Hammad |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Kaminkow |
| 8,005,426 | B2 | 8/2011 | Huomo et al. |
| 8,010,405 | B1 | 8/2011 | Bortolin et al. |
| RE42,762 | E | 9/2011 | Shin et al. |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |
| 8,266,451 | B2 | 9/2012 | Leydier et al. |
| 8,276,814 | B1 | 10/2012 | Davis |
| 8,285,329 | B1 | 10/2012 | Zhu |
| 8,302,872 | B2 | 11/2012 | Mullen |
| 8,312,519 | B1 | 11/2012 | Bailey et al. |
| 8,316,237 | B1 | 11/2012 | Felsher et al. |
| 8,332,272 | B2 | 12/2012 | Fisher |
| 8,346,670 | B2 | 1/2013 | Hasson |
| 8,365,988 | B1 | 2/2013 | Medina, III et al. |
| 8,369,960 | B2 | 2/2013 | Tran et al. |
| 8,371,501 | B1 | 2/2013 | Hopkins |

(56)             References Cited

U.S. PATENT DOCUMENTS

| | | |
|---|---|---|
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |

(56) References Cited

U.S. PATENT DOCUMENTS

| | | |
|---|---|---|
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0191161 A1* | 8/2011 | Dai ...................... G06Q 20/40 705/17 |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |

(56)   References Cited

U.S. PATENT DOCUMENTS

| | | |
|---|---|---|
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0181520 A1* | 6/2014 | Wendling ............ H04L 63/0853 |
| | | 713/169 |
| 2014/0208112 A1 | 7/2014 | McDonald et al. |
| 2014/0214674 A1 | 7/2014 | Narula |
| 2014/0229375 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0148197 A1* | 5/2016 | Dimmick ............... G06Q 20/32 |
| | | 705/67 |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |

(56) References Cited

U.S. PATENT DOCUMENTS

| | | | |
|---|---|---|---|
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2020/0250672 A1* | 8/2020 | Rule | G06F 21/35 |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0036349 A1* | 2/2022 | Newman | H04L 9/0866 |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | |
|---|---|---|---|
| CN | 103023643 A | 4/2013 | |
| CN | 103417202 A | 12/2013 | |
| EP | 1085424 A1 | 3/2001 | |
| EP | 1223565 A1 | 7/2002 | |
| EP | 1265186 A2 | 12/2002 | |
| EP | 1783919 A1 | 5/2007 | |
| EP | 2139196 A1 | 12/2009 | |
| EP | 1469419 A1 | 8/2012 | |
| EP | 2852070 A1 | 3/2015 | |
| GB | 2457221 A | 8/2009 | |
| GB | 2516861 A | 2/2015 | |
| GB | 2551907 A | 1/2018 | |
| KR | 101508320 B1 | 4/2015 | |
| KR | 20150140132 A | 12/2015 | |
| WO | 9910824 A1 | 3/1999 | |
| WO | 0049586 A1 | 8/2000 | |
| WO | 2006070189 A2 | 7/2006 | |
| WO | 2008055170 A2 | 5/2008 | |
| WO | 2009025605 A2 | 2/2009 | |
| WO | 2010049252 A1 | 5/2010 | |
| WO | 2011112158 A1 | 9/2011 | |
| WO | 2012001624 A1 | 1/2012 | |
| WO | 2013039395 A1 | 3/2013 | |
| WO | 2013155562 A1 | 10/2013 | |
| WO | 2013192358 A2 | 12/2013 | |
| WO | 2014043278 A1 | 3/2014 | |
| WO | 2014170741 A2 | 10/2014 | |
| WO | 2015179649 A1 | 11/2015 | |
| WO | 2015183818 A1 | 12/2015 | |
| WO | 2016097718 A1 | 6/2016 | |
| WO | 2016160816 A1 | 10/2016 | |
| WO | 2016168394 A1 | 10/2016 | |
| WO | 2017042375 A1 | 3/2017 | |
| WO | 2017042400 A1 | 3/2017 | |
| WO | 2017047855 A1 | 3/2017 | |
| WO | 2017157859 A1 | 9/2017 | |
| WO | 2017208063 A1 | 12/2017 | |
| WO | 2018063809 A1 | 4/2018 | |
| WO | 2018137888 A1 | 8/2018 | |
| WO | 2019022585 A1 | 1/2019 | |
| WO | 2021051884 A1 | 3/2021 | |
| WO | 2021133492 A1 | 7/2021 | |
| WO | 2022108959 A1 | 5/2022 | |
| WO | 2022187350 A1 | 9/2022 | |
| WO | 2023017943 A1 | 2/2023 | |
| WO | 2023064063 A1 | 4/2023 | |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

(56) References Cited

OTHER PUBLICATIONS

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application, International Journal of Advanced Computer Science and Applications," 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification", Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

100

102 — CONTACTLESS CARD

104 — CLIENT DEVICE

106 — NETWORK

108 — SERVER

200

202 — SERVER

204 — TRANSMITTING DEVICE

206 — NETWORK

208 — RECEIVING DEVICE

210 → 212 → 214

216 → 218 → 220

600

| 7 | 6 | 5 | 4 | 3 | 2 | 1 | 0 |
|---|---|---|---|---|---|---|---|
| MB | ME | CF | 1 | IL | TNF | | |

TYPE LENGTH

PAYLOAD LENGTH

ID LENGTH

TYPE

ID

PAYLOAD

800

START

802 — OBTAIN pNPR ID AND pDKI VALUES TO IDENTIFY RELEVANT ISSUE MASTER KEYS FOR AUTHENTICATION

804 — DIVERSIFY ISSUE MASTER KEYS BASED ON UNIQUE ID NUMBER AND PAN PSN

806 — CREATE CARD UNIQUE KEYS TO GENERATE SESSION KEYS

808 — USE SESSION KEYS TO GENERATE CRYPTOGRAM AND ENCIPHER DATA

END

900

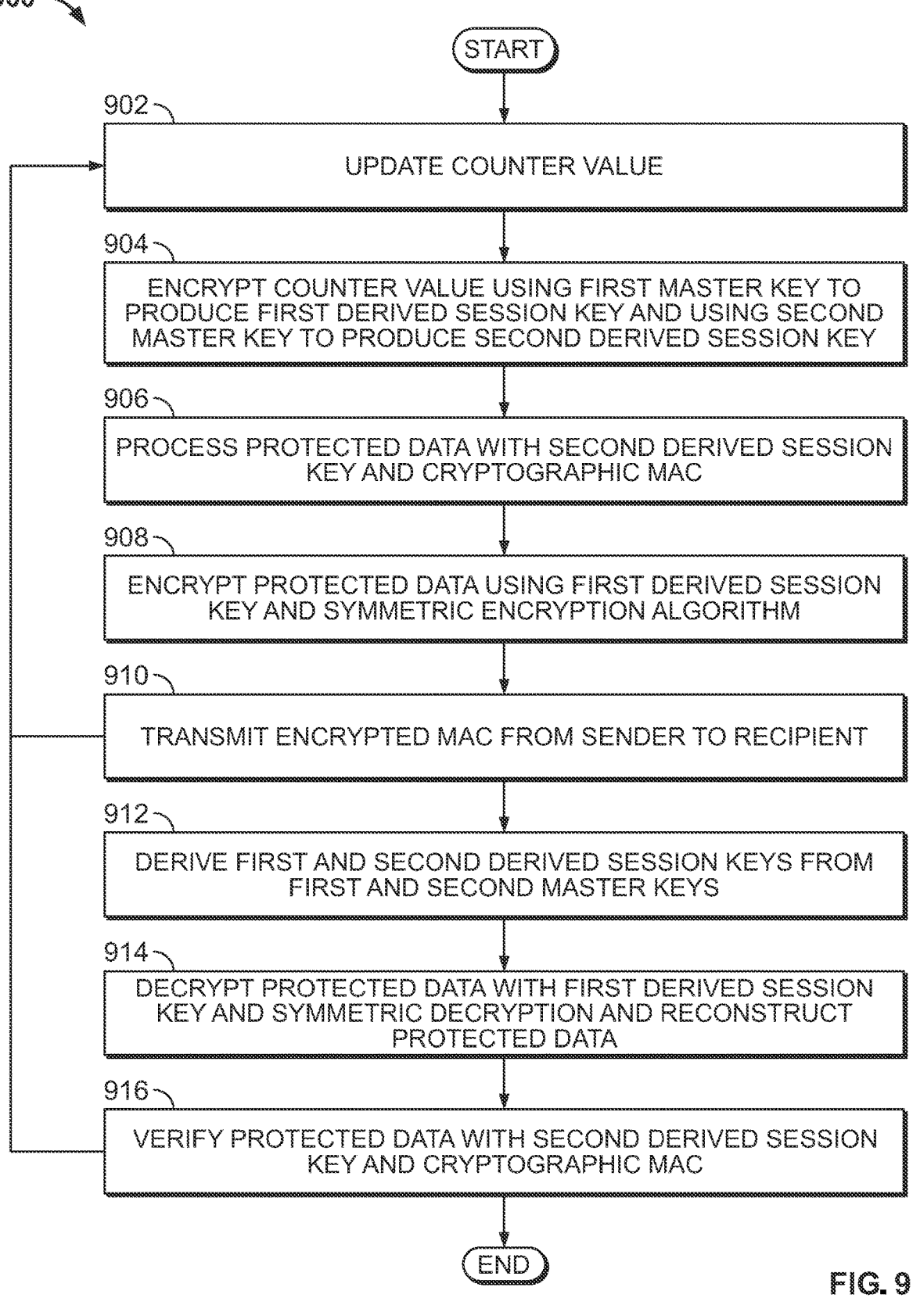

START

902 — UPDATE COUNTER VALUE

904 — ENCRYPT COUNTER VALUE USING FIRST MASTER KEY TO PRODUCE FIRST DERIVED SESSION KEY AND USING SECOND MASTER KEY TO PRODUCE SECOND DERIVED SESSION KEY

906 — PROCESS PROTECTED DATA WITH SECOND DERIVED SESSION KEY AND CRYPTOGRAPHIC MAC

908 — ENCRYPT PROTECTED DATA USING FIRST DERIVED SESSION KEY AND SYMMETRIC ENCRYPTION ALGORITHM

910 — TRANSMIT ENCRYPTED MAC FROM SENDER TO RECIPIENT

912 — DERIVE FIRST AND SECOND DERIVED SESSION KEYS FROM FIRST AND SECOND MASTER KEYS

914 — DECRYPT PROTECTED DATA WITH FIRST DERIVED SESSION KEY AND SYMMETRIC DECRYPTION AND RECONSTRUCT PROTECTED DATA

916 — VERIFY PROTECTED DATA WITH SECOND DERIVED SESSION KEY AND CRYPTOGRAPHIC MAC

END

START

1002

DYNAMICALLY GENERATE DATA

1004

TRANSMIT ENCRYPTED DATA TO DEVICE VIA USER INTERFACE RECOGNITION

1006

TRANSMIT ENCRYPTED DATA TO SERVER

1008

DECRYPT DATA AND COMPARE TO RECORD DATA TO ACTIVATE

1010

RETURN MESSAGE INDICATING SUCCESSFUL ACTIVATION TO DISCONTINUE DYNAMIC GENERATION OF DATA

END

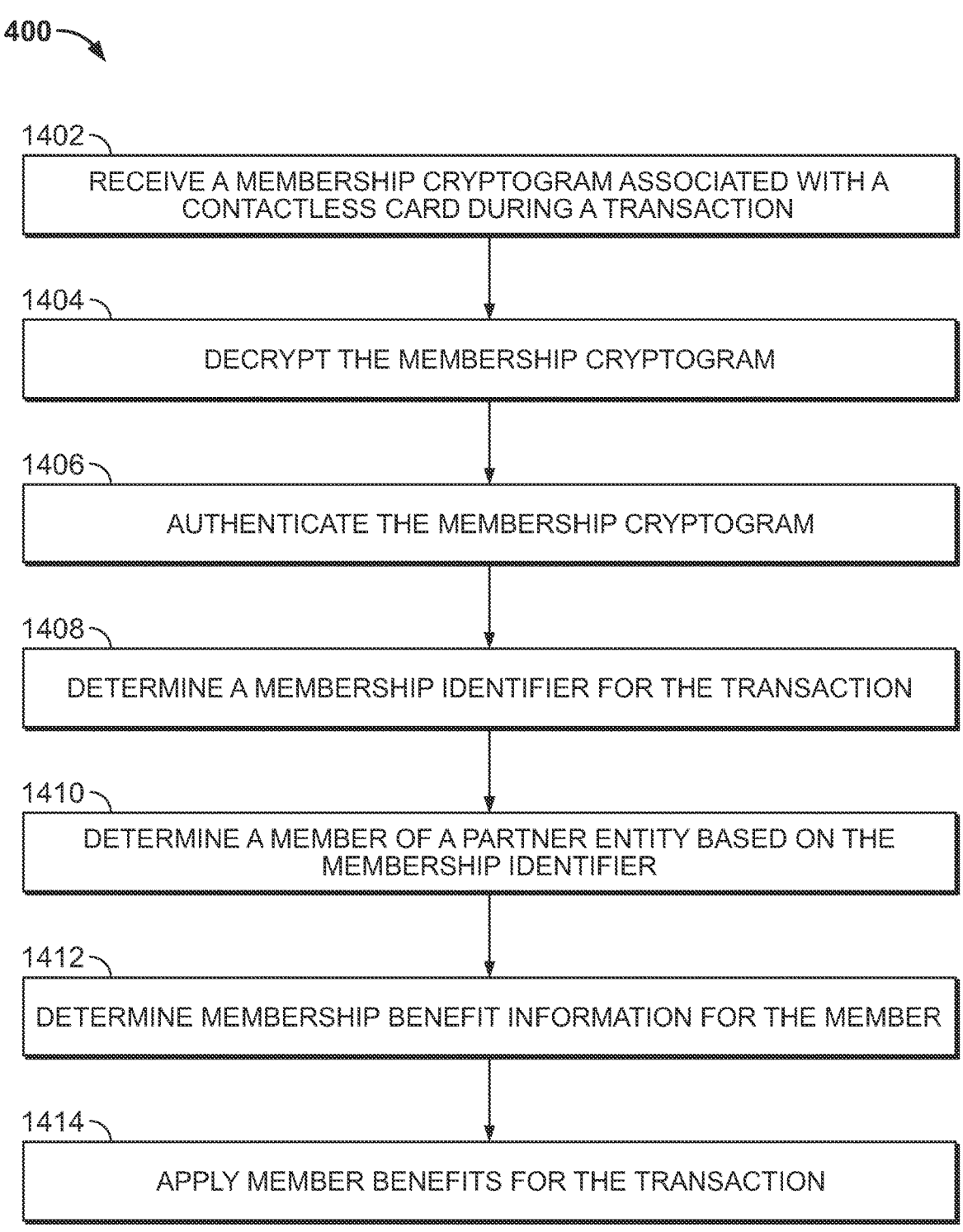

1400

1402 — RECEIVE A MEMBERSHIP CRYPTOGRAM ASSOCIATED WITH A CONTACTLESS CARD DURING A TRANSACTION

1404 — DECRYPT THE MEMBERSHIP CRYPTOGRAM

1406 — AUTHENTICATE THE MEMBERSHIP CRYPTOGRAM

1408 — DETERMINE A MEMBERSHIP IDENTIFIER FOR THE TRANSACTION

1410 — DETERMINE A MEMBER OF A PARTNER ENTITY BASED ON THE MEMBERSHIP IDENTIFIER

1412 — DETERMINE MEMBERSHIP BENEFIT INFORMATION FOR THE MEMBER

1414 — APPLY MEMBER BENEFITS FOR THE TRANSACTION

FIG. 14

MEMBERSHIP ACCOUNT MANAGEMENT USING A CONTACTLESS CARD

BACKGROUND

Enterprises, such as retailers, may employ membership accounts for customers to access features such as loyalty points, discounts, member-only purchases, and/or the like. A retailer, for example, a grocery store or shopping club, may provide a customer member with a membership identifier and a membership card. Typically, the membership identifier is printed on the back of the card, for instance, as a bar code. As such, there is a potential for fraud and misuse of this information, such as a card not present transaction.

Managing multiple membership cards involves the time-consuming process of cardholders calling a telephone number or visiting a website and entering or otherwise providing personal information. Further, while the growing use of chip-based financial cards provides more secure features over previous technologies (for example, magnetic strip cards) for in-person purchases, account access still typically relies on log-in credentials (for instance, username and password) to confirm a cardholder's identity and/or otherwise complete a transaction. However, if the log-in credentials are compromised, another person could have access to the user's account.

The problem of account security becomes exacerbated when attempting to efficiently accessing multiple accounts, as a single authorization credential or mechanism can pose an aggravated security risk if it is compromised, whether the account access relates to membership functions, payments, redemption activity, or general access. In addition, performing a transaction at a retailer using a membership account (for example, to access loyalty points, discounts, make authorized member purchases, and/or the like) and a payment card (for example, a credit card or debit card) typically requires the use of multiple cards or a combination of cards and login credential, which is inefficient and inconvenient for consumers.

Accordingly, there is a need to improve authentication mechanisms for membership account access and transactions processing, including payment and redemption transactions.

SUMMARY

Systems, methods, apparatuses, and computer-readable media for managing membership functions of a partner entity using contactless card authentication are described. For example, in some embodiments, a method may include receiving a membership cryptogram generated by a contactless card in communication with the client device during a transaction, the contactless card associated with at least one partner entity having a plurality of members, decrypting the membership cryptogram based on at least one master key for the contactless card to determine a decryption result, authenticating the membership cryptogram based on the decryption result; and responsive to authentication of the membership cryptogram: determining a membership identifier for the transaction, determining a member of the plurality of members based on the membership identifier, and transmitting membership benefit information to the client device to facilitate at least one membership function associated with the member for the transaction.

In one embodiment, a system may include at least one server comprising a processor and a memory storing instructions that, when executed by the processor, cause the processor to: receive, via a client device, a membership cryptogram generated by a contactless card in communication with the client device during a transaction, the contactless card associated with at least one partner entity having a plurality of members, decrypt the membership cryptogram based on at least one master key for the contactless card to determine a decryption result, authenticate the membership cryptogram based on the decryption result, and responsive to authentication of the membership cryptogram: determine a membership identifier for the transaction, determine a member of the plurality of members based on the membership identifier, and transmit membership benefit information to the client device to facilitate at least one membership function associated with the member for the transaction.

In some embodiments of the system, the membership cryptogram may include a member identifier configured to identify a membership of a contactless card user with the at least one partner entity.

In various embodiments of the system, the membership cryptogram may include a partner identifier configured to identify the at least one partner entity.

In some embodiments of the system, the instructions, when executed by the processor, may cause the processor to determine a partner identifier stored on the contactless card, and route the membership cryptogram to a partner entity back-end system identified by the partner identifier.

In exemplary embodiments of the system, the partner identifier may be determined based on the decryption result.

In various embodiments of the system, the at least one master key may include a set of membership master keys.

In some embodiments of the system, the at least one partner entity may include at least one of a retailer, a shopping club, or a member-based entity.

In various embodiments of the system, the at least one membership function may include at least one of a discount, a reward, loyalty points, a coupon, a purchase privilege, or historical transaction information.

In one embodiment, a method may include, via at least one server of at least one back-end processing system, receiving, via a client device, a membership cryptogram generated by a contactless card in communication with the client device during a transaction, the contactless card associated with at least one partner entity having a plurality of members; decrypting the membership cryptogram based on at least one master key for the contactless card to determine a decryption result; authenticating the membership cryptogram based on the decryption result; and responsive to authentication of the membership cryptogram: determining a membership identifier for the transaction, determining a member of the plurality of members based on the membership identifier, and transmitting membership benefit information to the client device to facilitate at least one membership function associated with the member for the transaction.

In some embodiments of the method, the membership cryptogram may include a member identifier configured to identify a membership of a contactless card user with the at least one partner entity.

In various embodiments of the method, the membership cryptogram may include a partner identifier configured to identify the at least one partner entity.

In exemplary embodiments of the method, the method may further include determining a partner identifier stored on the contactless card, and routing the membership cryptogram to a partner entity back-end system identified by the partner identifier.

In some embodiments of the method, the partner identifier may be determined based on the decryption result.

In various embodiments of the method, the at least one master key may include a set of membership master keys.

In some embodiments of the method, the at least one partner entity may include at least one of a retailer, a shopping club, or a member-based entity.

In some embodiments of the method, the at least one membership function may include at least one of a discount, a reward, loyalty points, a coupon, a purchase privilege, or historical transaction information.

In some embodiments of the method, the at least one server may include a card-issuer server and a partner entity server.

In one embodiment, a non-transitory computer-readable storage medium may include instructions that, when executed by a processor, cause the processor to: receive, via a client device, a membership cryptogram generated by a contactless card in communication with the client device during a transaction, the contactless card associated with at least one partner entity having a plurality of members; decrypt the membership cryptogram based on at least one master key for the contactless card to determine a decryption result; authenticate the membership cryptogram based on the decryption result; and responsive to authentication of the membership cryptogram: determine a membership identifier for the transaction, determine a member of the plurality of members based on the membership identifier, and transmit membership benefit information to the client device to facilitate at least one membership function associated with the member for the transaction.

In some embodiments of the non-transitory computer-readable storage medium, the instructions, when executed by the processor, may cause the processor to determine a partner identifier stored on the contactless card, and route the membership cryptogram to a partner entity back-end system identified by the partner identifier.

In various embodiments of the non-transitory computer-readable storage medium, the at least one partner entity may include at least one of a retailer, a shopping club, or a member-based entity.

BRIEF DESCRIPTION OF THE DRAWINGS

FIG. 9 illustrates an aspect of the subject matter in accordance with one embodiment.

FIG. 14 illustrates an embodiment of a logic flow for processing a transaction using a contactless card according to some embodiments.

DETAILED DESCRIPTION

For the purposes of promoting an understanding of the principles of the present disclosure, reference will now be made to the embodiments illustrated in the figures and specific language will be used to describe the same. It will nevertheless be understood that no limitation of the scope of the disclosure is thereby intended. Any alterations and further modifications in the described embodiments, and any further applications of the principles of the present disclosure as described herein are contemplated as would normally occur to one skilled in the art to which the disclosure relates.

The described technology generally relates to managing membership of a partner entity using a contactless card. A partner entity may be or may include a retailer, shopping club, member-based entity (e.g., a gym, a health club, a country club, a sports club, etc.) that has members (or customers with a registered account). A contactless card may be generated with membership information, such as membership identifiers, partner entity identifiers, and/or the like stored directly on the card. In various embodiments, the contactless card may be configured to provide secure membership benefits, membership-based transactions, and/or the like (instead of or in addition to payment transactions). For example, the membership information (such as a member identifier) may be encrypted in a cryptogram. The cryptogram may be authenticated, for instance, via a card-issuer system or a partner entity system. Accordingly, membership functions and benefits may be securely and efficiently managed via a contactless card according to some embodiments.

Figures 1, 2:
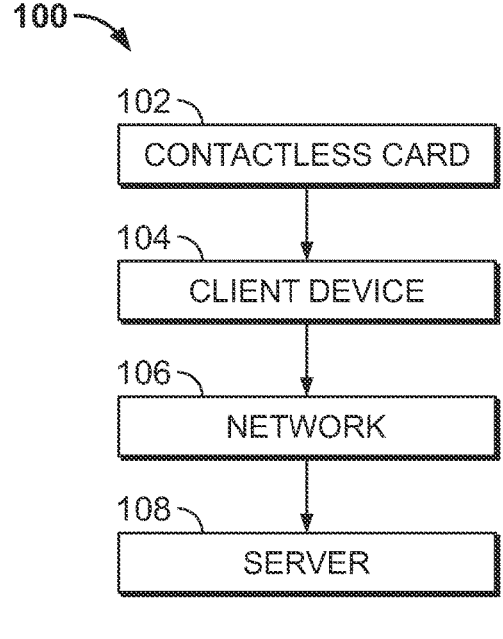
FIG. 1 illustrates an aspect of the subject matter in accordance with one embodiment.
FIG. 2 illustrates an aspect of the subject matter in accordance with one embodiment.

FIG. 1 illustrates a data transmission system 100 according to some embodiments. As further discussed below, system 100 may include contactless card 102, client device 104, network 106, and server 108. Although FIG. 1 illustrates single instances of the components, system 100 may include any number of components.

System 100 may include one or more contactless cards 102, which are further explained below. In some embodiments, contactless card 102 may be in wireless communication, utilizing near-field communication (NFC) in an example, with client device 104.

System 100 may include client device 104, which may be a network-enabled computer. As referred to herein, a network-enabled computer may include, but is not limited to, a computer device, or communications device including, e.g., a server, a network appliance, a personal computer, a workstation, a phone, a handheld PC, a personal digital assistant, a thin client, a fat client, an Internet browser, a point-of-sale device, combinations thereof, and/or the like. Client device 104 may also be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 104 can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 104 of system 100 may execute one or more applications, such as software applications, that enable, for example, network communications with one or more components of system 100 and transmit and/or receive data.

System 100 may include one or more servers 108. In some examples, server 108 may include one or more processors, which are coupled to memory. The server 108 may be configured as a central system, server, or platform to control and call various data at different times to execute a plurality of workflow functions according to some embodiments. Server 108 may be configured to connect to one or more databases (not shown). The server 108 may be connected to at least one client device 104.

System 100 may include one or more networks 106. In some examples, network 106 may be one or more of a wireless network, a wired network or any combination of wireless network and wired network, and may be configured to connect client device 104 to server 108. For example, network 106 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family of networking, Bluetooth, NFC, Radio Frequency Identification (RFID), Wi-Fi, and/or the like.

In addition, network 106 may include, without limitation, telephone lines, fiber optics, IEEE Ethernet 802.3, a wide area network, a wireless personal area network, a LAN, or a global network such as the Internet. In addition, network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more examples, network 106 may comprise a plurality of interconnected networks, such as, for example, the Internet, a service provider's network, a cable television network, corporate networks, such as credit card association networks, and home networks.

The client device 104 may be in communication with one or more server(s) 108 via one or more network(s) 106 and may operate as a respective front-end (client device 104) to back-end (server 108) pair with server 108. The client device 104 may transmit, for example from a mobile device application executing on the client device 104, one or more requests to server 108. The one or more requests may be associated with retrieving data from the server 108. The server 108 may receive the one or more requests from client device 104. Based on the one or more requests from the client device 104, the server 108 may be configured to retrieve the requested data from one or more databases (not shown). Based on receipt of the requested data from the one or more databases, the server 108 may be configured to transmit the received data to the client device 104, the received data being responsive to one or more requests.

FIG. 2 illustrates a data transmission system according to an example embodiment. As shown in FIG. 2, a system 200 may include a transmitting or transmitting device 204, a receiving or receiving device 208 in communication, for example via a network 206, with one or more servers 202. The transmitting device 204 may be the same or similar to the client device 104 discussed above with reference to FIG. 1. The receiving device 208 may be the same or similar to the client device 104 discussed above with reference to FIG. 1. The network 206 may be the same or similar to the network 106 discussed above with reference to FIG. 1. The server 202 may be the same or similar to server 108 discussed above with reference to FIG. 1. Although FIG. 2 shows single instances of components of the system 200, the system 200 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data that the attacker has that was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data that the attacker is able to gather is limited, which thereby reduces exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used without needing to resort to any form of key exchange to keep the parties in sync. By periodically changing the shared secret symmetric key used by the sender and the recipient, the attacks described above are rendered impossible.

Referring back to FIG. 2, the system 200 may be configured to implement key diversification. For example, a sender and recipient may desire to exchange data (e.g., original sensitive data) via respective devices 204 and 208. As explained above, although single instances of the transmitting device 204 and the receiving device 208 may be included, it is understood that one or more transmitting devices 204 and one or more receiving devices 208 may be involved so long as each party shares the same shared secret symmetric key. In some examples, the transmitting device 204 and the receiving device 208 may be provisioned with the same master symmetric key. Further, it is understood that any party or device holding the same secret symmetric key may perform the functions of the transmitting device 204 and similarly any party holding the same secret symmetric key may perform the functions of the receiving device 208. In some examples, the symmetric key may comprise the shared secret symmetric key which is kept secret from all parties other than the transmitting device 204 and the receiving device 208 involved in exchanging the secure data. It is further understood that both the transmitting device 204 and the receiving device 208 may be provided with the same master symmetric key, and further that part of the data exchanged between the transmitting device 204 and the receiving device 208 comprises at least a portion of data which may be referred to as the counter value. The counter value may comprise a number that changes each time data is exchanged between the transmitting device 204 and the receiving device 208.

The system 200 may include one or more networks 206. In some examples, the network 206 may be one or more of a wireless network, a wired network or any combination of wireless network and wired network, and may be configured to connect one or more transmitting devices 204 and one or more receiving devices 208 to server 202. For example, the network 206 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family network, Bluetooth, NFC, RFID, Wi-Fi, and/or the like.

In addition, the network 206 may include, without limitation, telephone lines, fiber optics, IEEE Ethernet 902.3, a wide area network, a wireless personal area network, a LAN, or a global network such as the Internet. In addition, the network 206 may support an Internet network, a wireless communication network, a cellular network, or the like, or any combination thereof. Network 206 may further include one network, or any number of the exemplary types of networks mentioned above, operating as a stand-alone network or in cooperation with each other. The network 206 may utilize one or more protocols of one or more network elements to which they are communicatively coupled. The network 206 may translate to or from other protocols to one or more protocols of network devices. Although the network 206 is depicted as a single network, it should be appreciated that according to one or more examples, the network 206 may comprise a plurality of interconnected networks, such as, for example, the Internet, a service provider's network, a cable television network, corporate networks, such as credit card association networks, and home networks.

In some examples, one or more transmitting devices 204 and one or more receiving devices 208 may be configured to communicate and transmit and receive data between each other without passing through the network 206. For example, communication between the one or more transmitting devices 204 and the one or more receiving devices 208 may occur via at least one of NFC, Bluetooth, RFID, Wi-Fi, and/or the like.

At block 210, when the transmitting device 204 is preparing to process the sensitive data with symmetric cryptographic operation, the sender may update a counter. In addition, the transmitting device 204 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 212, the transmitting device 204 may take the selected cryptographic algorithm, and using the master symmetric key, process the counter value. For example, the sender may select a symmetric encryption algorithm, and use a counter which updates with every conversation between the transmitting device 204 and the receiving device 208. The transmitting device 204 may then encrypt the counter value with the selected symmetric encryption algorithm using the master symmetric key, creating a diversified symmetric key.

In some examples, the counter value may not be encrypted. In these examples, the counter value may be transmitted between the transmitting device 204 and the receiving device 208 at block 212 without encryption.

At block 214, the diversified symmetric key may be used to process the sensitive data before transmitting the result to the receiving device 208. For example, the transmitting device 204 may encrypt the sensitive data using a symmetric encryption algorithm using the diversified symmetric key, with the output comprising the protected encrypted data. The transmitting device 204 may then transmit the protected encrypted data, along with the counter value, to the receiving device 208 for processing.

At block 216, the receiving device 208 may first take the counter value and then perform the same symmetric encryption using the counter value as input to the encryption, and the master symmetric key as the key for the encryption. The output of the encryption may be the same diversified symmetric key value that was created by the sender.

At block 218, the receiving device 208 may then take the protected encrypted data and using a symmetric decryption algorithm along with the diversified symmetric key, decrypt the protected encrypted data.

At block 220, as a result of the decrypting the protected encrypted data, the original sensitive data may be revealed.

The next time sensitive data needs to be sent from the sender to the recipient via respective transmitting device 204 and receiving device 208, a different counter value may be selected producing a different diversified symmetric key. By processing the counter value with the master symmetric key and same symmetric cryptographic algorithm, both the transmitting device 204 and the receiving device 208 may independently produce the same diversified symmetric key. This diversified symmetric key, not the master symmetric key, is used to protect the sensitive data.

As explained above, both the transmitting device 204 and the receiving device 208 each initially possess the shared master symmetric key. The shared master symmetric key is not used to encrypt the original sensitive data. Because the diversified symmetric key is independently created by both the transmitting device 204 and receiving device 208, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 204 and the receiving device 208 may be governed by symmetric requirements for how often to create a new diversification value, and therefore a new diversified symmetric key. In an embodiment, a new diversification value and therefore a new diversified symmetric key may be created for every exchange between the transmitting device 204 and the receiving device 208.

In some examples, the key diversification value may comprise the counter value. Other non-limiting examples of the key diversification value include: a random nonce generated each time a new diversified key is needed, the random nonce sent from the transmitting device 204 to the receiving device 208; the full value of a counter value sent from the transmitting device 204 and the receiving device 208; a portion of a counter value sent from the transmitting device 204 and the receiving device 208; a counter independently maintained by the transmitting device 204 and the receiving device 208 but not sent between the two devices; a one-time-passcode exchanged between the transmitting device 204 and the receiving device 208; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 204 and the receiving device 208. In effect, this may create a one-time use key, such as a single-use session key.

Figure 3:
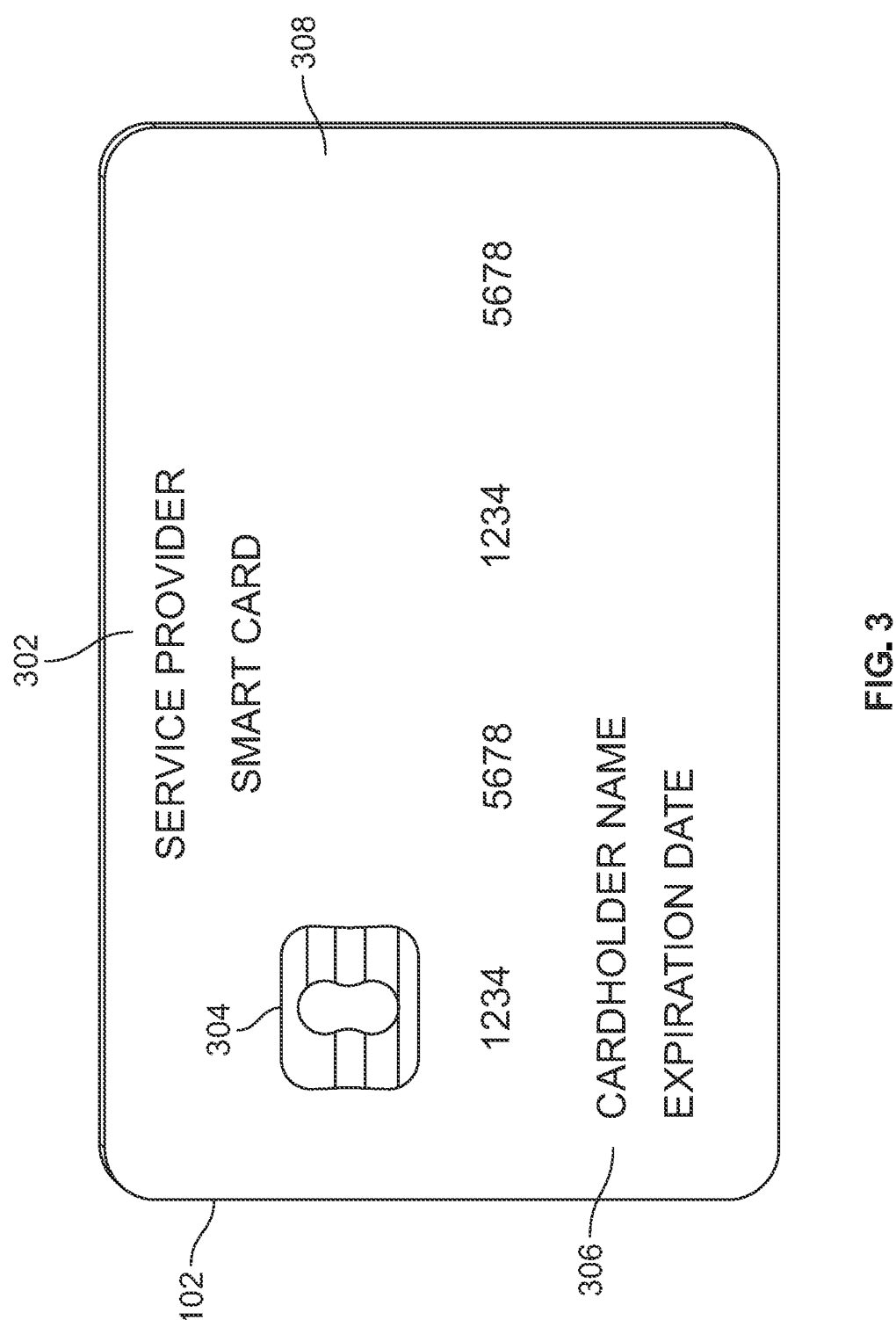
FIG. 3 illustrates a contactless card 102 in accordance with one embodiment.

FIG. 3 illustrates an example configuration of a contactless card 102, which may include a contactless card, a payment card (such as a credit card or a debit card), a membership card, or gift card, issued by a service provider (for instance, which may be displayed as service provider indicia 302 on the front or back of the contactless card 102). In some embodiments, the contactless card 102 may be issued by a service provider in association with a partner entity (e.g., a retailer, shopping club, member-based enterprise, and/or the like). In such embodiments, the indicia may be or may include the name or other representation of the partner entity.

In some examples, the contactless card 102 is not related to a payment card, and may include, without limitation, an identification card, a membership card, a loyalty card, a rewards card, a purchase privilege card (e.g., members must have the card (or other proof of membership) in order to make purchases, for instance, at a shopping club), and/or the like. In some examples, the transaction card may include a dual interface contactless payment card, a membership card, a rewards card, and so forth. The contactless card 102 may include a substrate 308, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and/or the transaction card may otherwise be compliant with the ISO/IEC 14443 standard. However, it is understood that the contactless card 102 according to the present disclosure may have different characteristics, and the present disclosure does not require a transaction card to be implemented in a payment card.

The contactless card 102 may also include identification information 306 displayed on the front and/or back of the card, and a contact pad 304. The contact pad 304 may include one or more pads and may be configured to establish contact with another client device, such as an ATM, a user device, smartphone, laptop, desktop, or tablet computer via transaction cards. The contact pad may be designed in accordance with one or more standards, such as ISO/IEC 7816 standard, and/or enable communication in accordance with the EMV protocol. The contactless card 102 may also include processing circuitry, antenna and other components as will be further discussed in FIG. 4. These components may be located behind the contact pad 304 or elsewhere on the substrate 308, e.g., within a different layer of the substrate 308, and may be electrically and physically coupled with the contact pad 304. The contactless card 102 may also include a magnetic strip or tape, which may be located on the back of the card (not shown in FIG. 3). The contactless card 102 may also include a Near-Field Communication (NFC) device coupled with an antenna capable of communicating via the NFC protocol. Embodiments are not limited in this manner.

Figure 4:
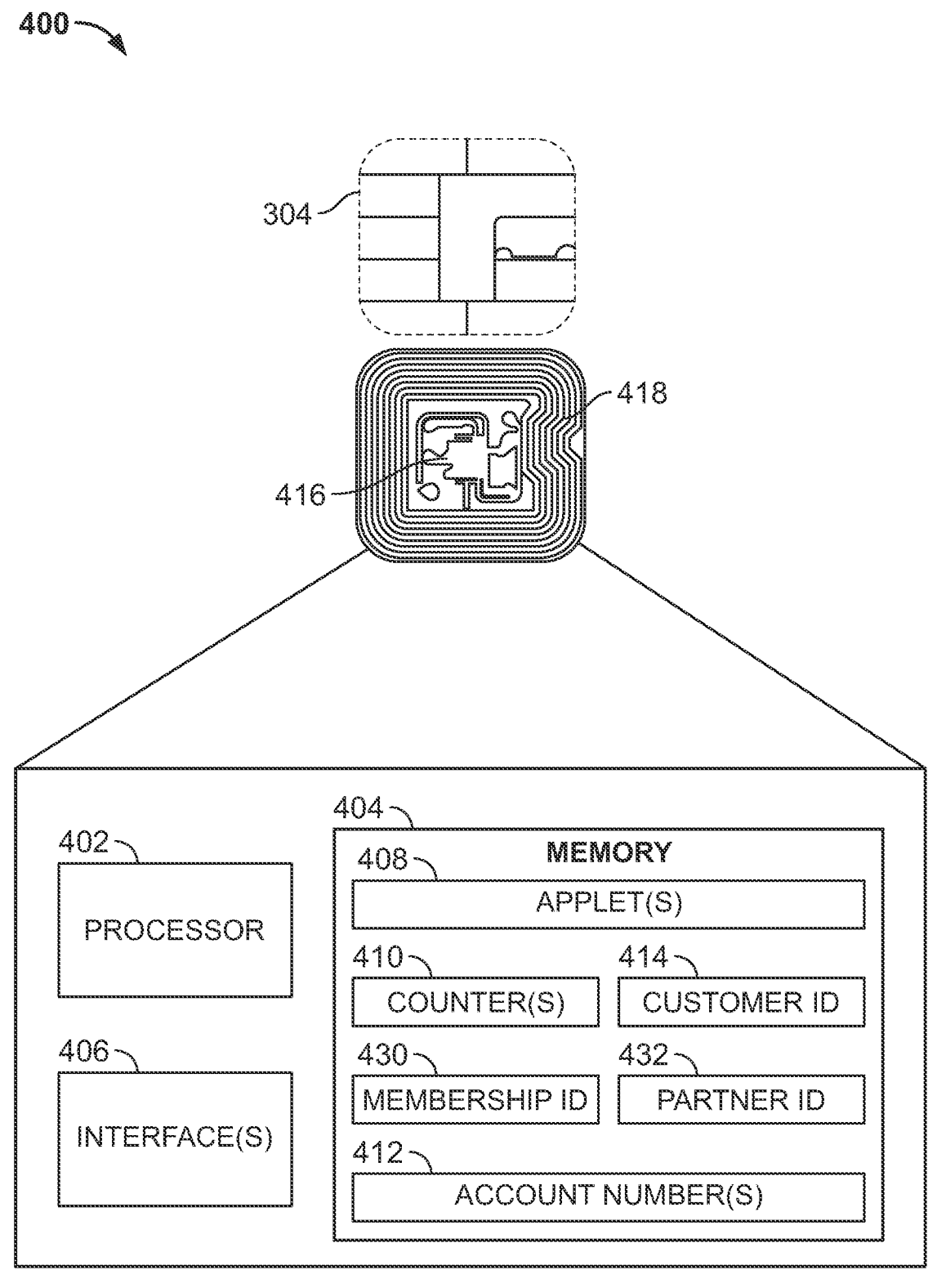
FIG. 4 illustrates a transaction card component 400 in accordance with one embodiment.

As illustrated in FIG. 4, the contact pad 304 of contactless card 102 may include processing circuitry 416 for storing, processing, and communicating information, including a processor 402, a memory 404, and one or more interface(s) 406. It is understood that the processing circuitry 416 may contain additional components, including processors, memories, error and parity/CRC checkers, data encoders, anticollision algorithms, controllers, command decoders, security primitives and tamperproofing hardware, as necessary to perform the functions described herein.

The memory 404 may be a read-only memory, write-once read-multiple memory or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 404 may be encrypted memory utilizing an encryption algorithm executed by the processor 402 to encrypted data.

The memory 404 may be configured to store one or more applet(s) 408, one or more counter(s) 410, a customer identifier 414, a membership identifier 430, a partner identifier 432, account number(s) 412, which may be virtual account numbers, and/or the like. The one or more applet(s) 408 may include one or more software applications configured to execute on one or more contactless cards, such as a Java® Card applet. However, it is understood that applet(s) 408 are not limited to Java Card applets, and instead may be any software application operable on contactless cards or other devices having limited memory. The one or more counter(s) 410 may comprise a numeric counter sufficient to store an integer.

The customer identifier 414 may comprise a unique alphanumeric identifier assigned to a user of the contactless card 102, and the identifier may distinguish the user of the contactless card from other contactless card users. In some examples, the customer identifier 414 may identify both a customer and an account assigned to that customer and may further identify the contactless card 102 associated with the customer's account. As stated, the account number(s) 412 may include thousands of one-time use virtual account numbers associated with the contactless card 102. An applet(s) 408 of the contactless card 102 may be configured to manage the account number(s) 412 (e.g., to select an account number(s) 412, mark the selected account number(s) 412 as used, and transmit the account number(s) 412 to a mobile device for auto filling by an auto filling service).

Figure 11:
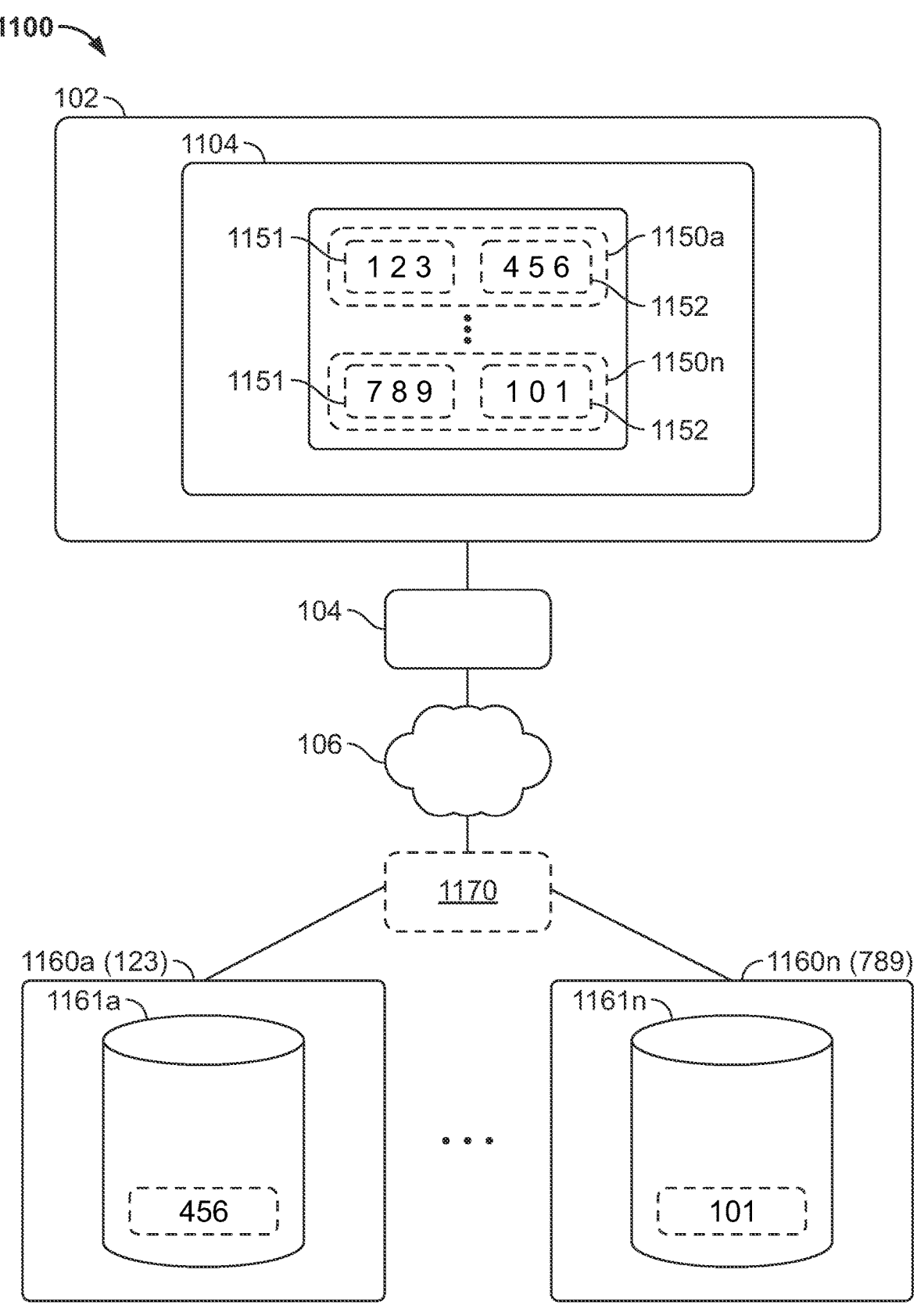
FIG. 11 depicts an exemplary operating environment consistent with some embodiments.

A membership identifier (membership ID or member ID) 430 may be a unique identifier assigned to a user of the card in relation to a partner entity enterprise (for instance, in some embodiments, an enterprise that may be separate from the card-issuer of contactless card 102) (see, for example, FIG. 11). For instance, a membership ID 430 may be a membership account identifier for a customer of a partner entity that includes, without limitation, a retailer, such as a grocery store, clothing retailer, e-commerce retailer, a shopping club, and/or the like. The membership ID 430 may be associated with a new or existing account that the user has with the enterprise (for instance, in some embodiments, that is separate from an account that the user has with the issuer of the contactless card). For example, a user may have a membership account with a shopping club that allows for certain member functions, benefits, and/or the like. For instance, the membership account may be required to purchase items at a shopping club, use/accumulate loyalty points, use/accumulate discounts, and/or the like. In some embodiments, the membership ID 430 may be for a partner enterprise, for example, a partner (e.g., retailer) associated with the card issuer (e.g., a bank or other financial institution). In other embodiments, the membership ID 430 may be for the card issuer (for instance, a retailer, shopping club, bank, financial institution, membership-based organization (e.g., a gym), combinations thereof, and/or the like).

In one example, a user may open a membership with a retailer and receive a membership account with a membership account number. The retailer (or an enterprise associated with the retailer) may be in partnership with the issuer of contactless card 102 to manage membership functions during transactions using the contactless card 102. The user may then obtain a contactless card 102 and have their membership account number (with the retailer) be assigned as a membership ID 430 of the contactless card 102.

In some embodiments, the membership ID 430 with the enterprise may be separate from the customer identifier (e.g., customer ID 414) associated with an issuer/manager of the contactless card 102. In exemplary embodiments, the customer ID 414 may be the membership ID 430 (i.e., there is only one unique alphanumeric identifier assigned to the user of the contactless card 102, which is the membership ID 430). Accordingly, in some embodiments, reference to a customer ID, account number, card ID, or other unique ID for the contactless card 102 may refer to the membership ID 430.

In various embodiments, a contactless card 102 may be associated with one membership ID 430. In some embodiments, a contactless card 102 may be associated with a plurality of member IDs 430 (for example, for one or more enterprises having membership functions managed by the contactless card 102). In this manner, a single contactless card 102 may be used in connection with multiple member IDs 430 for multiple enterprises (for instance, a grocery store membership, a gym membership, and/or the like). In various embodiments, the membership ID 430 may be used in combination with and/or in place of the account numbers 412 and/or customer ID 414 in various embodiments, for instance, where the account numbers 412 are used for various functions, such as encryption/decryption, key generation, and/or the like. In exemplary embodiments, the membership ID 430 may be used in place of the customer ID 414 (for instance, the customer ID 414 may be the membership ID 430). In some embodiments, the membership ID 430 may be used for membership functions associated with the membership and the account numbers 412 and/or customer ID 414 may be used to process payment functions (e.g., credit card functions, debit card functions, and/or the like). Accordingly, a single contactless card 102 may be used to manage both membership functions and transaction/payment functions.

A partner identifier (partnership identifier, partnership ID, or partner ID) 432 may be an identifier of the enterprise associated with the membership ID 430. For example, the enterprise may be a retailer, shopping club, gym, and/or other organization having members. The partner enterprise may be in partnership with the card-issuer of the contactless card 102 to manage the membership during transactions with the contactless card 102. In some embodiments, the partner ID 432 may be used to identify a particular partner entity and to route information to a processing or back-end system associated with the partner entity. A contactless card 102 may be able to work with multiple different partner entities, including on the same card. For example, a contactless card 102 may be set up for members of Partner Entity A, Partner Entity B, . . . , Partner Entity N. Each of Partner Entities A-N may be assigned a unique partner ID so that the contactless card 102 (and any processing systems associated with the contactless card 102 and processing/ transmitting data thereof) may know how to handle the data and/or where to transmit the data for processing, member lookup, and/or the like.

For example, Partner Entity A may have a partner ID 432 of "123" and Partner Entity B may have a partner ID 432 of "456." Data, transactions, and/or the like with a partner ID 432 "123" may be handled according to the process for Partner Entity A (for instance, the membership ID is sent to the Partner Entity A back-end system) and data, transactions, and/or the like with a partner ID 432 of "456" may be handled according to the process for Partner Entity B.

Typically, accessing member functions for an enterprise requires a card (for instance, a retailer card for accessing or verifying a membership with the retailer), login credentials, and/or the like. Accordingly, when making a purchase using a credit card, debit card, and/or the like that involves member functions, a customer is required to use the membership card (or login credentials) and then pay with the credit card, debit card, and/or the like. However, with a member-managed card, such as contactless card 102 according to some embodiments, a user may perform a transaction with a retailer that manages member functions (for instance, discounts, loyalty points, and/or the like), including in a secure manner, using cryptography and other data security functions according to various embodiments. In addition, the contactless card may also, in some embodiments, manage card payment functions along with member functions using a single card in a single transaction process. In some embodiments, the partner ID 432 may be included as part of the membership ID 430 (see, for example, FIG. 11).

The processor 402 and memory elements of the foregoing exemplary embodiments are described with reference to the contact pad 304, but the present disclosure is not limited thereto. It is understood that these elements may be implemented outside of the contact pad 304 or entirely separate from it, or as further elements in addition to processor 402 and memory 404 elements located within the contact pad 304.

In some examples, the contactless card 102 may comprise one or more antenna(s) 418. The one or more antenna(s) 418 may be placed within the contactless card 102 and around the processing circuitry 416 of the contact pad 304. For example, the one or more antenna(s) 418 may be integral with the processing circuitry 416 and the one or more antenna(s) 418 may be used with an external booster coil. As another example, the one or more antenna(s) 418 may be external to the contact pad 304 and the processing circuitry 416.

In an embodiment, the coil of contactless card 102 may act as the secondary of an air core transformer. The terminal may communicate with the contactless card 102 by cutting power or amplitude modulation. The contactless card 101 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 418, processor 402, and/or the memory 404, the contactless card 101 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 408 may be added to contactless cards to provide a one-time password (OTP) for multifactor authentication (MFA) in various mobile application-based use cases. Applet(s) 408 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 408 may be configured to encode the OTP as an NDEF type 4 well known type text tag. In some examples, NDEF messages may comprise one or more records. The applet(s) 408 may be configured to add one or more static tag records in addition to the OTP record.

In some examples, the one or more applet(s) 408 may be configured to emulate an RFID tag. The RFID tag may include one or more polymorphic tags. In some examples, each time the tag is read, different cryptographic data is presented that may indicate the authenticity of the contactless card. Based on the one or more applet(s) 408, an NFC read of the tag may be processed, the data may be transmitted to a server, such as a server of a banking system, and the data may be validated at the server.

In some examples, the contactless card 102 and server may include certain data such that the card may be properly identified. The contactless card 102 may include one or more unique identifiers (not pictured). Each time a read operation takes place, the counter(s) 410 may be configured to increment. In some examples, each time data from the contactless card 102 is read (e.g., by a mobile device), the counter(s) 410 is transmitted to the server for validation and determines whether the counter(s) 410 are equal (as part of the validation) to a counter of the server.

The one or more counter(s) 410 may be configured to prevent a replay attack. For example, if a cryptogram has been obtained and replayed, that cryptogram is immediately rejected if the counter(s) 410 has been read or used or otherwise passed over. If the counter(s) 410 has not been used, it may be replayed. In some examples, the counter that is incremented on the card is different from the counter that is incremented for transactions. The contactless card 101 is unable to determine the application transaction counter(s) 410 since there is no communication between applet(s) 408 on the contactless card 102.

In some examples, the counter(s) 410 may get out of sync. In some examples, to account for accidental reads that initiate transactions, such as reading at an angle, the counter(s) 410 may increment but the application does not process the counter(s) 410. In some examples, when the mobile device 10 is woken up, NFC may be enabled and the device 110 may be configured to read available tags, but no action is taken responsive to the reads.

To keep the counter(s) 410 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 410 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 410 increases in the appropriate sequence, then it possible to know that the user has done so.

The key diversification technique described herein with reference to the counter(s) 410, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, cryptographic keys may be assigned uniquely per card. In some embodiments, the cryptographic keys may include one or more sets of cryptographic keys, such as an issuer set of cryptographic keys (master keys associated with the issuer of the card) and/or a partner set of cryptographic keys (master keys or member master keys (MMKs) associated with a partner entity of the card).

The cryptographic keys may comprise symmetric keys which may be used in both encryption and decryption of data. Triple DES (3DES) algorithm may be used by EMV, and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
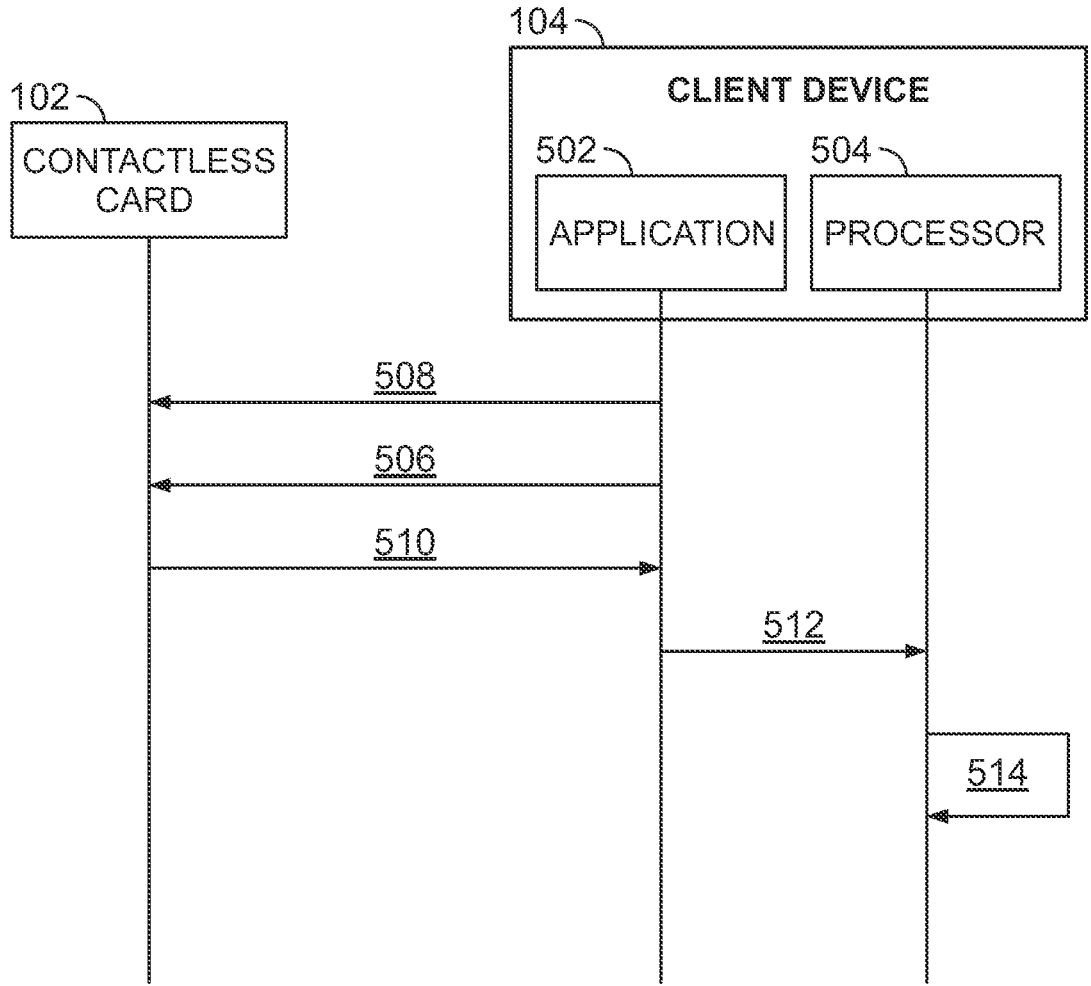
FIG. 5 illustrates a sequence flow 500 in accordance with one embodiment.

FIG. 5 is a timing diagram illustrating an example sequence for providing authenticated access according to one or more embodiments of the present disclosure. Sequence flow 500 may include contactless card 102 and client device 104, which may include an application 502 and processor 504.

At line 508, the application 502 communicates with the contactless card 102 (e.g., after being brought near the contactless card 102). Communication between the application 502 and the contactless card 102 may involve the contactless card 102 being sufficiently close to a card reader (not shown) of the client device 104 to enable data transfer (for instance, via NFC) between the application 502 and the contactless card 102.

At line 506, after communication has been established between client device 104 and contactless card 102, contactless card 102 generates a message authentication code (MAC) cryptogram. In some examples, this may occur when the contactless card 102 is read by the application 502. In particular, this may occur upon a read, such as an NFC read, of a near field data exchange (NDEF) tag, which may be created in accordance with the NFC Data Exchange Format. For example, a reader application, such as application 502, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 102 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 502 may be configured to transmit a request to contactless card 102, the request comprising an instruction to generate a MAC cryptogram.

At line 510, the contactless card 102 sends the MAC cryptogram to the application 502. In some examples, the transmission of the MAC cryptogram occurs via NFC, however, the present disclosure is not limited thereto. In other examples, this communication may occur via Bluetooth, Wi-Fi, or other means of wireless data communication. At line 512, the application 502 communicates the MAC cryptogram to the processor 504.

At line 514, the processor 504 verifies the MAC cryptogram pursuant to an instruction from the application 122. For example, the MAC cryptogram may be verified, as explained below. In some examples, verifying the MAC cryptogram may be performed by a device other than client device 104, such as a server of a banking system in data communication with the client device 104. For example, processor 504 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 6:
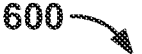
FIG. 6 illustrates a data structure 600 in accordance with one embodiment.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well-known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 7:
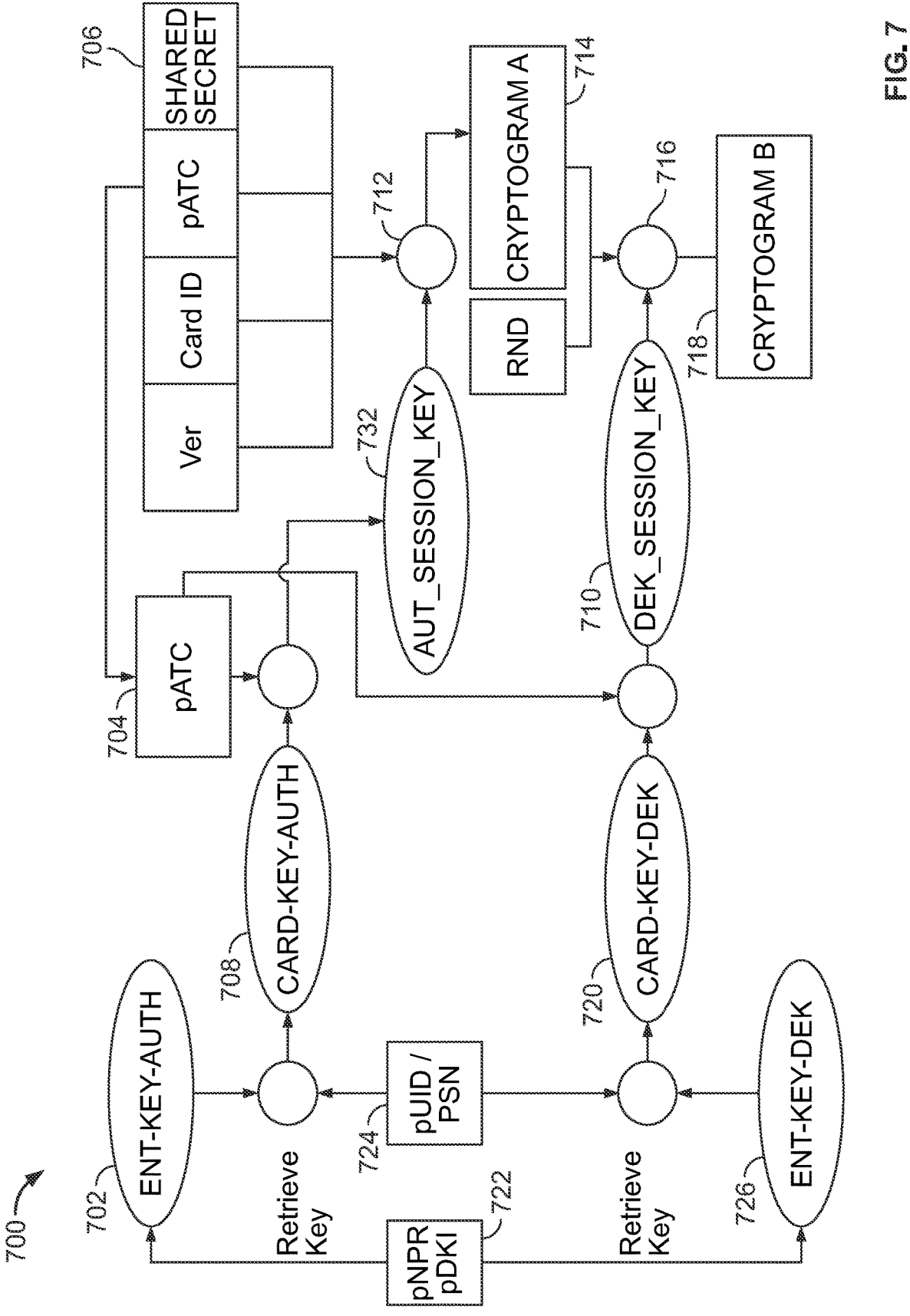
FIG. 7 is a diagram of a key system according to an example embodiment.

FIG. 7 illustrates a diagram of a system 700 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV, and it is implemented by hardware in the contactless card. By using a key diversification process, one or more keys may be derived from a master key based upon uniquely identifiable information for each entity that requires a key.

Regarding master key management, two entity master keys 702, 726 may be required for each part of the portfolio on which the one or more applets is issued. In some embodiments, at least one of the entity master keys 702, 726 may be an issuer master key associated with and/or specified by an issuer of the contactless card. In various embodiments, at least one of the entity master keys 702, 726 may be a membership master key associated with a membership and/or or specified by a membership partner (for example, a retailer, shopping club, and/or the like).

In various embodiments, the first master key 702 may comprise an Entity Cryptogram Generation/Authentication Key (Ent-Key-Auth) and the second master key 726 may comprise an Entity Data Encryption Key (Ent-Key-DEK). As further explained herein, the two entity master keys 702, 726 are diversified into card master keys 708, 720, which are unique for each card. In some examples, a network profile record ID (pNPR) 722 and derivation key index (pDKI) 724, as back-office data, may be used to identify which Entity Master Keys 702, 726 to use in the cryptographic processes for authentication. The system performing the authentication may be configured to retrieve values of pNPR 722 and pDKI 724 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 708 and Card-Key-Dek 720). The session keys (Aut-Session-Key 732 and DEK-Session-Key 710) may be generated by the one or more applets and derived by using the application transaction counter (pATC) 704 with one or more algorithms. To fit data into the one or more algorithms, only the 2 low order bytes of the 4-byte pATC 704 is used. In some examples, the four-byte session key derivation method may comprise: F1:=PATC(lower 2 bytes)‖'F0'‖'00'‖PATC (four bytes) F1:=PATC(lower 2 bytes)‖'0F'‖'00'‖PATC (four bytes) SK:={(ALG (MK) [F1])‖ALG (MK) [F2]}, where ALG may include 3DES ECB and MK may include the card unique derived master key.

As described herein, one or more MAC session keys may be derived using the lower two bytes of pATC 704 counter. At each tap of the contactless card, pATC 704 is configured to be updated, and the card master keys Card-Key-AUTH 508 and Card-Key-DEK 720 are further diversified into the session keys Aut-Session-Key 732 and DEK-Session-KEY 710. pATC 704 may be initialized to zero at personalization or applet initialization time. In some examples, the pATC counter 704 may be initialized at or before personalization and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 732. The data specified in cryptogram may be processed with javacard.signature method: ALG DES_MAC8_ISO9797_1_M2_ALG3 to correlate to EMV ARQC verification methods. The key used for this computation may include a session key AUT-Session-Key 732, as explained above. As explained above, the low order two bytes of the counter may be used to diversify for the one or more MAC session keys. As explained below, AUT-Session-Key 732 may be used to MAC data 706, and the resulting data or cryptogram A 714 and random number RND may be encrypted using DEK-Session-Key 710 to create cryptogram B or output 718 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 710 derived from the Card-Key-DEK 720. In this case, the ATC value for the session key derivation is the least significant byte of the counter pATC 704.

The format below represents a binary version example embodiment. Further, in some examples, the first byte may be set to ASCII 'A'.

19

| Message Format | | | | |
|---|---|---|---|---|
| 1 | 2 | 4 | 8 | 8 |
| 0x43 (Message Type 'A') | Version | pATC | RND | Cryptogram A (MAC) |

| Cryptogram A (MAC) 8 bytes MAC of | | | | |
|---|---|---|---|---|
| 2 | 8 | 4 | 4 | 18 bytes input data |
| Version | pUID | pATC | Shared Secret | |

| Message Format | | | |
|---|---|---|---|
| 1 | 2 | 4 | 16 |
| 0x43 (Message Type 'A') | Version | pATC | Cryptogram B |

| Cryptogram A (MAC) 8 bytes MAC of | | | | |
|---|---|---|---|---|
| 2 | 8 | 4 | 4 | 18 bytes input data |
| Version | pUID | pATC | Shared Secret | |

| Cryptogram B 16 Sym Encryption of | |
|---|---|
| 8 | 8 |
| RND | Cryptogram A |

Another exemplary format is shown below. In this example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |

| 8 bytes | | | | |
|---|---|---|---|---|
| 8 | 8 | 4 | 4 | 18 bytes input data |
| pUID | pUID | pATC | Shared Secret | |

| Message Format | | | |
|---|---|---|---|
| 2 | 8 | 4 | 16 |
| Version | pUID | pATC | Cryptogram B |

| 8 bytes | | | |
|---|---|---|---|
| 8 | 4 | 4 | 18 bytes input data |
| pUID | pUID | pATC | Shared Secret |

| Cryptogram B 16 Sym Encryption of | |
|---|---|
| 8 | 8 |
| RND | Cryptogram A |

The UID field of the received message may be extracted to derive, from master keys Ent-Key-AUTH 702 and Ent-Key-DEK 726, the card master keys (Card-Key-Auth 708 and Card-Key-DEK 720) for that particular card. Using the card master keys (Card-Key-Auth 708 and Card-Key-DEK 720), the counter (pATC) field of the received message may be used to derive the session keys (Aut-Session-Key 732 and DEK-Session-Key 710) for that particular card. Cryptogram B 718 may be decrypted using the DEK-Session-KEY 710, which yields cryptogram A 714 and RND, and RND may be discarded. The UID field may be used to look up the shared secret of the contactless card which, along with the Ver, UID, and pATC fields of the message, may be processed through the cryptographic MAC using the re-created Aut-Session-Key 732 to create a MAC output, such as MAC'. If MAC' is the same as cryptogram A 714, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 732. The input data 706 may take the following form: Version (2), pUID (8), pATC (4), Shared Secret (4). In various embodiments, the pUID may be or may include a membership ID, member ID, partner ID, and/or a combination thereof. In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 712, data 706 is processed through the MAC using Aut-Session-Key 732 to produce MAC output (cryptogram A) 714, which is encrypted.

In order to provide additional protection against brute force attacks exposing the keys on the card, it is desirable that the MAC cryptogram 714 be enciphered. In some examples, data or cryptogram A 714 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 710. In the encryption operation 716, data or cryptogram A 714 and RND are processed using DEK-Session-Key 510 to produce encrypted data, cryptogram B 718. The data 714 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram. In various embodiments, the pUID may be or may include a membership ID, a member ID, partner ID, and/or a combination thereof.

In some embodiments, the system 700 may operate to generate different types of cryptograms, for instance, based on the type of entity master keys 702, 726, the pDKI 724, MAC data 706, and/or other elements. For example, system 700 may include multiple sets of entity master keys 702, 726 (e.g., a membership set and an issuer set), multiple sets of pDKI 724 (e.g., a membership set and an issuer set), and/or multiple sets of MAC data 706 ((e.g., a membership set and an issuer set).

In various embodiments, for example, cryptogram B 718 may be generated as a membership cryptogram for membership functions associated with the contactless card 102. In exemplary embodiments, for instance, cryptogram B 718 may be generated as a transaction cryptogram for transaction (e.g., payment processing) functions. In various embodiments, the system 700 may only generate membership cryptograms for securely managing membership functions. In some embodiments, the system 700 may be capable of generating membership cryptograms for membership functions and a transaction cryptogram to process transaction functions.

For example, in various embodiments, the system 700 may use the membership master keys as the entity master keys 702, 726 to generate CARD-KEY-AUTH 708, CARD-KEY-DEK 720, AUT_SESSION_KEY 732, DEK_SES- SION_KEY, and, ultimately, the cryptogram B 718 (i.e., a membership cryptogram). In some embodiments, the pDKI 724 may be or may include membership information (e.g., membership ID, member ID, etc.) when generating a membership cryptogram 718. For example, pUID may be a membership number with a partner entity assigned to the contactless card 102. In various embodiments, the MAC data 706 may be or may include membership information (e.g., membership ID, member ID, etc.) when generating a membership cryptogram 718.

For example, in various embodiments, the system 700 may use the issuer master keys as the entity master keys 702, 726 to generate CARD-KEY-AUTH 708, CARD-KEY-DEK 720, AUT SESSION KEY 732, DEK_SESSION_ KEY, and, ultimately, the cryptogram B 718 (i.e., a transaction cryptogram). In some embodiments, the pDKI 724 may be or may include customer information (e.g., customer ID, issuer account number, etc.) when generating a transaction cryptogram 718. For example, pUID may be a membership number with a partner entity assigned to the contactless card 102. In various embodiments, the MAC data 706 may be or may include customer information (e.g., customer ID, issuer account number, etc.) when generating a transaction cryptogram 718.

In some embodiments, system 700 may only include one set of entity master keys 702, 726. In such embodiments, membership cryptograms 718 may be generated by using the entity master keys 702, 726 with membership information (e.g., a membership set of pDKI 724 and/or MAC data 706). Transaction cryptograms 718 may be generated by using the entity master keys 702, 726 with issuer information (e.g., an issuer set of pDKI 724 and/or MAC data 706).

Figure 8:
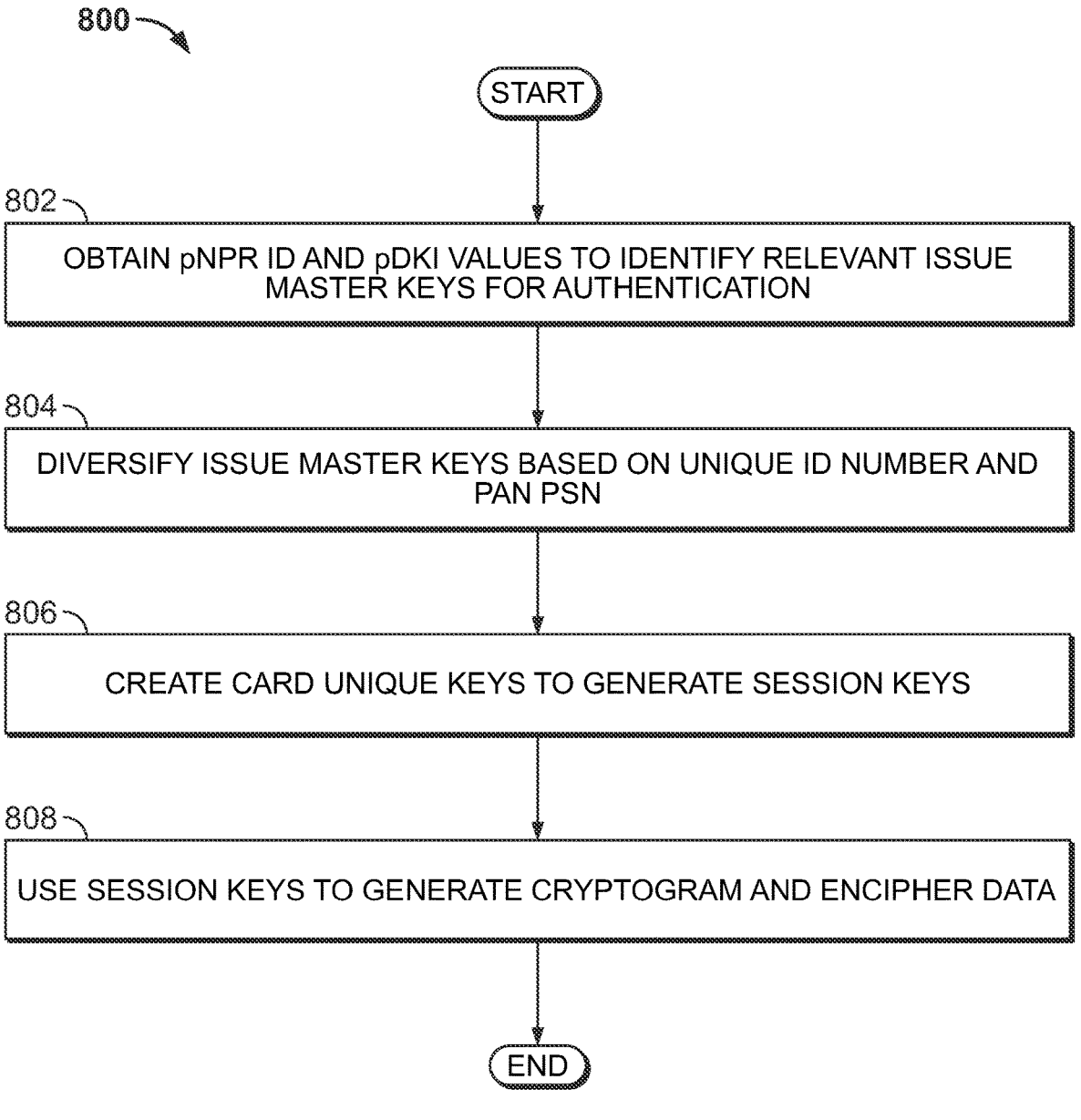
FIG. 8 is a flowchart of a method of generating a cryptogram according to an example embodiment.

FIG. 8 illustrates a method 800 for generating a cryptogram. For example, at block 802, a network profile record ID (pNPR) and derivation key index (pDKI) may be used to identify which Entity Master Keys to use in the cryptographic processes for authentication. In some examples, the method may include performing the authentication to retrieve values of pNPR and pDKI for a contactless card at the time of authentication.

At block 804, Entity Master Keys may be diversified by combining them with one or more unique ID numbers associated with the card (e.g., pUID, membership ID, member ID, partner ID, combinations thereof, and/or the like) and the PAN sequence number (PSN) of one or more applets, for example, a payment applet.

At block 806, Card-Key-Auth and Card-Key-DEK (unique card keys) may be created by diversifying the Entity Master Keys to generate session keys which may be used to generate a MAC cryptogram.

At block 808, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

FIG. 9 depicts an exemplary process 900 illustrating key diversification according to some embodiments. Initially, a sender and the recipient may be provisioned with two different master keys (e.g., issuer master keys and/or member master keys). For example, a first master key may comprise the data encryption master key, and a second master key may comprise the data integrity master key. The sender has a counter value, which may be updated at block 902, and other data, such as data to be protected, which it may secure share with the recipient.

At block 904, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 906, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 908, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 910, the encrypted MAC is transmitted, from the sender to the recipient, with sufficient information to identify additional secret information (such as shared secret, master keys, etc.), for verification of the cryptogram.

At block 912, the recipient uses the received counter value to independently derive the two derived session keys from the two master keys as explained above.

At block 914, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 916, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 902) and a new set of session keys may be created (at block 910). In some examples, the combined random data may be discarded.

Figure 10:
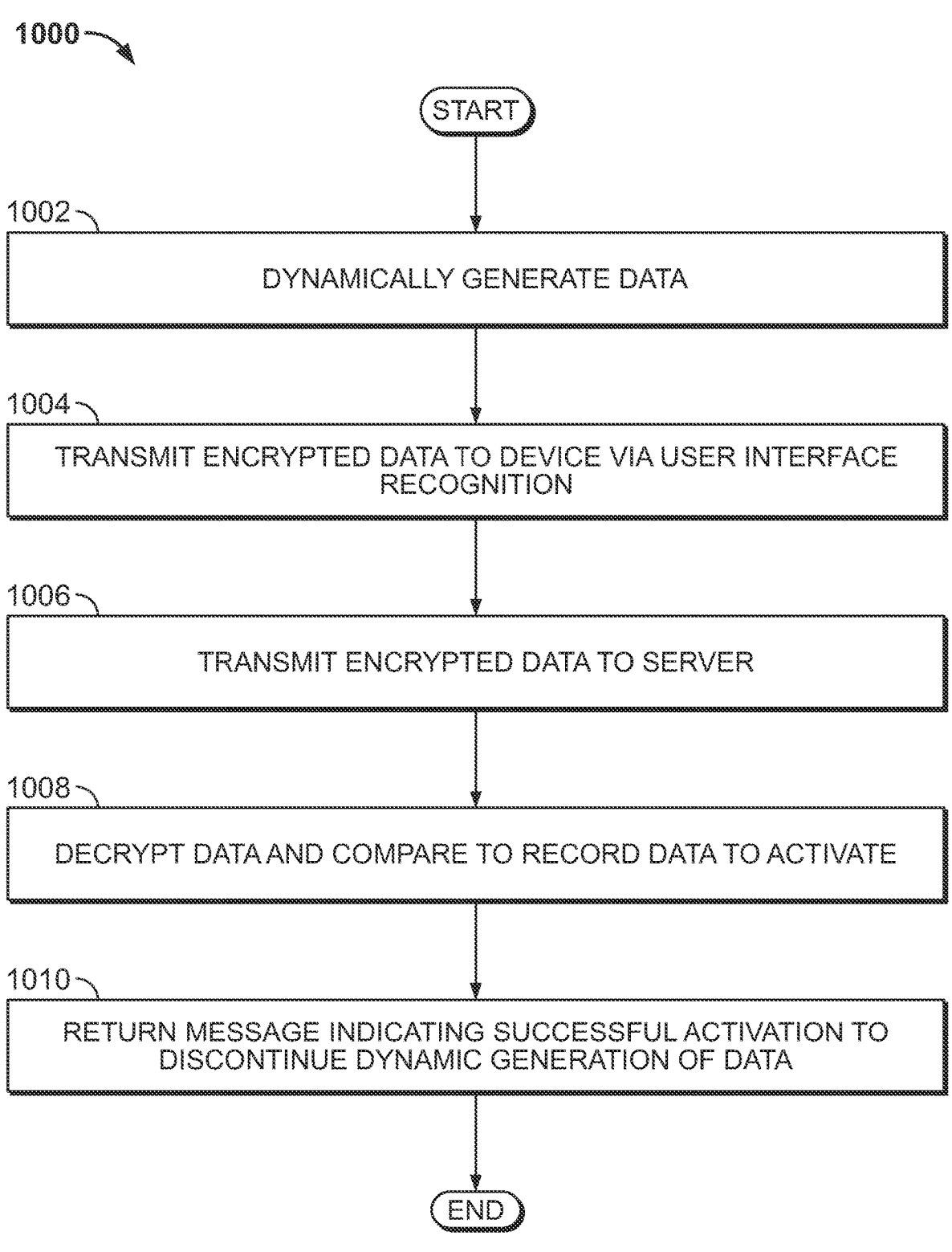
FIG. 10 illustrates an aspect of the subject matter in accordance with one embodiment.

FIG. 10 illustrates a method 1000 for card activation according to an example embodiment. For example, card activation may be completed by a system including a card, a device, and one or more servers. The contactless card, device, and one or more servers may reference same or similar components that were previously explained, such as contactless card 102, client device 104, and a server 108.

In block 1002, the card may be configured to dynamically generate data. In some examples, this data may include information such as an account number, card identifier, card verification value, membership ID, member ID, partner ID, phone number, expiry date, combinations thereof, and/or the like, which may be transmitted from the card to the device. In some examples, one or more portions of the data may be encrypted via the systems and methods disclosed herein.

In block 1004, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1006, the one or more portions of the data may be communicated to one or more servers, such as a card issuer server, enterprise server (for instance, a server associated with a partner entity, retailer entity, and/or the like). For example, one or more encrypted portions of the data may be transmitted from the device to the card issuer server and/or partner entity server for activation of the card.

In block 1008, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1010, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

FIG. 11 depicts an exemplary operating environment consistent with some embodiments. As shown in FIG. 11, an operating environment 1100 may include a contactless card 102. A contactless card according to some embodiments (such as the contactless card 102) may be associated with one or more entities. For instance, in some embodiments, the contactless card 102 may be a "private label" or "co-branded" card. In general, a co-branded card may be issued by a financial services company that manages the financial services functions of the contactless card 102 for the card owner in partnership with a partner entity that manages membership functions of the card owner (as a member or customer of the partner entity).

For example, the contactless card 102 may be associated with a card issuer, which may be or may include a bank or other financial institution that provides the contactless card 102 (for instance, as a credit card, a debit card, and/or the like) to an issuer customer and provides financial services associated with the contactless card 102, including, without limitation, payment processing services, credit card transaction services, debit card transaction services, and/or the like. In another example, the contactless card 102 may be associated with a partner entity. In some embodiments, a partner entity may be an enterprise that does not provide financial services associated with the contactless card (e.g., payment processing services), but may provide other services, such as membership services (e.g., loyalty program, discounts, membership functions, and/or the like) for customers, members, or other individuals associated with the contactless card 102. The partner entity may be a retailer, shopping club, member-based organization, and/or the like. The partner entity may have members or customers that have memberships or accounts with the partner.

In some embodiments, the contactless card 102 may only provide membership services via secure processes according to various embodiments.

In one non-limiting example, the contactless card 102 may be issued by Capital One Financial Corporation ("Capital One") of McLean, Virginia, United States of America (e.g., the card issuer) and the partner entity may be Costco Wholesale Corporation ("Costco") of Issaquah, Washington, United States of America. In this non-limiting example, Capital One (or an entity, subsidiary, vendor, etc. thereof) may provide payment processing functions (via Capital One back-end systems, servers, databases, and/or the like) associated with the contactless card 102 and Costco (or an entity, subsidiary, vendor, etc., thereof) may provide membership functions (via Costco back-end systems, servers, databases, and/or the like) associated with the contactless card 102. However, embodiments are not so limited. For instance, a card issuer may also provide membership functions, a partner entity may provide payment processing functions (or other financial processing functions), and/or the like.

Referring to FIG. 11, the contactless card 102 may include a logic device 1104 (for instance, a device the same or similar to contact pad 304). Logic device 1104 may be configured to store one or more membership identifiers 1150*a-n* that may be associated with a user or owner of the contactless card 102. In some embodiments, the membership identifiers 1150*a-n* may be or may include a member ID, a partner ID, and/or a combination thereof. In various embodiments, the membership identifiers 1150*a-n* may be or may include a member ID, a partner ID, a pUID, a customer ID, an account number, a combination thereof, and/or the like. In some embodiments, the membership identifiers 1150*a-n* may include numeric values, alphanumeric values, letters, symbols, combinations thereof, and/or the like.

A membership identifier 1150*a-n* may be formed of various segments 1151, 1152 configured to identify an entity, user, membership, account, and/or the like. For example, in some embodiments, membership identifier 1150*a* may include a partner ID segment 1151 configured as a unique identifier to identify a partner entity and a member ID segment 1152 configured as a unique identifier to identify a membership of the card owner with the partner entity. The partner segment 1151 may operate as a namespace for a particular partner entity. For example, each contactless card 102 issued for Partner Entity A (for instance, Costco) may have a partner segment 1151 of "123;" each contactless card 102 issued for Partner Entity B may have a partner segment 1151 of "789;" and so on.

Partner entities may provide member IDs or account numbers to members thereof. These member IDs may be used by the partner entities to manage membership functions, such as loyalty points, discounts, purchasing privileges, and/or the like. For example, a customer may apply to be a member of a partner entity (for instance, a grocery store or shopping club) and the partner entity may provide a member (or customer with a registered account) with a membership or loyalty card (or a username and password for an online account). This membership card (or online account) may be associated with a number or member ID. When making a purchase at the partner entity using the membership card (or online account), the partner entity looks up the member ID in their back-end systems to process membership functions, such as determining loyalty points, discounts, purchasing privileges, and/or the like.

In some embodiments, the card owner segment may be, may include, or may be based on the card owner's member ID with the partner entity. For instance, Card Owner A may sign up to be a member of Partner Entity A (for example, Costco) and may be assigned a member ID (for instance, "456") by Partner Entity A. Card Owner A may apply for the contactless card, which may be issued with an identifier 1150*a* stored on the contactless card that includes the partner ID 1151 of "123" (for Partner Entity A) and a member ID of "456." Accordingly, the partner ID 1151 segment of membership identifier 1150*a* may be associated with Partner Entity A and the member ID 1152 segment may be associated with a membership of Card Owner A with Partner Entity A.

In general, and without the intent to limit, in the present disclosure, the term "member ID" may refer to a membership, customer, or account number provided by a partner entity to an individual (for instance, a membership number for a member of Costco provided by Costco), and the term "membership identifier" may refer to the membership information assigned to the contactless card (for instance, by the issuer when setting up the card), which may be or may include a member ID (alone or in combination with other information, such as a partner ID).

In some embodiments, when a user performs a transaction with the contactless card 102, information may be transmitted to the client device 104 (for example, a mobile device, a point-of-sale device, and/or the like). In various embodiments, the transmitted information may be or may include a membership identifier 1150a-n. In exemplary embodiments, an application being executed via logic device 1104 (for instance, the applet 408 of the contact pad 304) may perform a membership determination process in response to a signal (for instance, a transaction signal indicating that a transaction is being performed). The membership determination process may operate to determine which membership is the subject of the transaction and use the corresponding membership identifier 1150a-n (for instance, membership identifier 1150a for a transaction with Partner Entity A, membership identifier 1150n for a transaction with Partner Entity N, and so on). For example, the client device 104 may transmit partner identifier information (a partner ID or other information associated with the partner entity) to the contactless card 102. The contactless card 102 may use this partner identifier to select the corresponding membership identifier 1150a-n to use for the transaction. In various embodiments, the transmitted information may include all membership identifiers 1150a-n and the membership determination process may be performed by the client device 104 and/or back-end systems of the partner entity and/or card issuer (for instance, routing system 1170).

In some embodiments, the membership identifier 1150a-n may be transmitted in an unencrypted form. In various embodiments, the membership identifier 1150a-n may be transmitted in an encrypted form. In exemplary embodiments, the membership identifier 1150a-n may be transmitted in an encrypted form as part of a cryptogram according to some embodiments (for example, as a membership cryptogram 718 or 1222). In some embodiments, at least a portion of the membership identifier 1150a-n may be processed, for example, for formatting, padding, and/or the like before, during, or after transmission from the contactless card 102.

In some embodiments, the membership identifier 1150a-n may be transmitted to a partner entity processing (or back-end) system 1160a-n. In some embodiments, the client device 104 may be used to route the membership identifier 1150a-n (for example, in a data package, cryptogram, and/or the like) to the partner entity back-end system 160a-n. In some embodiments, a routing system 1170 (alone or in combination with the client device 104) may be used to route the membership identifier 1150a-n to the partner entity back-end system 160a-n. In various embodiments, the routing system 1170 may be or may be associated with the card issuer (for instance, the same or similar to servers 108, 202, 1208, and/or other back-end systems associated with a card issuer). For example, the routing system 1170 may operate the same or similar to servers 108, 202, or 1208 to decrypt the cryptogram to determine the membership identifier 1150a-n (for instance, the partner ID and the member ID), which may be routed to the corresponding partner for member lookup.

In exemplary embodiments, the partner ID of the membership identifier 1150a-n may be used to route the membership identifier 1150a-n to the corresponding partner entity back-end system 160a-n. For example, all membership identifiers 1150a-n with a partner ID segment 1151 of "123" may be routed to back-end system 1160a (associated with Partner Entity A) and all membership identifiers

1150a-n with a partner ID segment 1151 of "789" may be routed to back-end system 1160n (associated with Partner Entity B).

A partner entity back-end system 1160a-n may access or include a membership database 1161a-n with records for memberships of the associated partner entity. The member ID segment 1152 of the membership identifier 1150a-n may be used by the partner entity back-end system 1160a-n to look up the member associated with the membership identifier 1150a-n in the membership database 1161a-n. Membership information associated with the member may be obtained, such as account information, loyalty points, discounts, purchase privileges, transaction history, coupons, and/or the like. The membership information may be used to perform the transaction via the contactless card 102 the same or similar to the process with an individual partner entity membership card or account (such as applying discounts, recording transactions, and/or the like).

In some embodiments, the membership information (for example, the member ID) may be retrieved from the contactless card 102 and provided to the client device 104 for processing by the partner entity the same or similar as when retrieving the information from a conventional membership card (for example, the logic device 1104 transmits the member ID to the client device 1104, which transmits the member ID to the partner back-end system 1160a-n).

In some embodiments, the routing system 1170 (for instance, operating as an issuer back-end system, such as server 108, 202, or 1208) may decrypt the cryptogram to determine the membership information, such as the partner ID and/or member ID. The partner entity, such as via partner entity back-end system 1160a-n, may retrieve the member ID (or other membership information) from the card issuer system, such as using an API call or similar function.

In some embodiments, the member ID may not be stored on the contactless card 102; instead, the member ID may be retrieved from a partner entity during a transaction based on another unique ID stored on the contactless card. For example, the member ID segment 1152 may not store the member ID (for instance, the membership or account number of the card owner with the partner entity); rather, the member ID segment 1152 stores another unique ID (such as an account number) of the user, such as a customer ID or account number of the user with the card issuer. The unique ID may be routed to the partner entity back-end 1160a-n, which may use the unique ID to determine the member and their member ID (for instance, via a database lookup in the partner entity database 1161a-n). This member ID may then be transmitted by the partner entity back-end 1160a-n to the client device 104 for processing of the member functions based on the member ID. In various embodiments, the member ID may be transmitted in a cryptogram generated according to some embodiments (for instance, cryptogram 718, cryptogram 1222, and/or the like). For example, the partner entity back-end 1160a-n may include software capable of operating the same or similar to system 700 and/or servers 202 or 1208 to generate cryptograms. The cryptograms may be resolved via the contactless card 102 and/or client device 104 according to some embodiments.

In various embodiments, the membership information (such as member ID), may include membership status information indicating a status of the membership associated with the partner entity. For example, the membership status information may include an expiration date of when the membership expires, an active status indicator to indicate whether the membership is active or deactivated, and/or the like. In this manner, the membership information may be used, for instance, directly via the client device 104, to determine the status of a membership, such as whether it has expired or has been deactivated.

Figure 12:
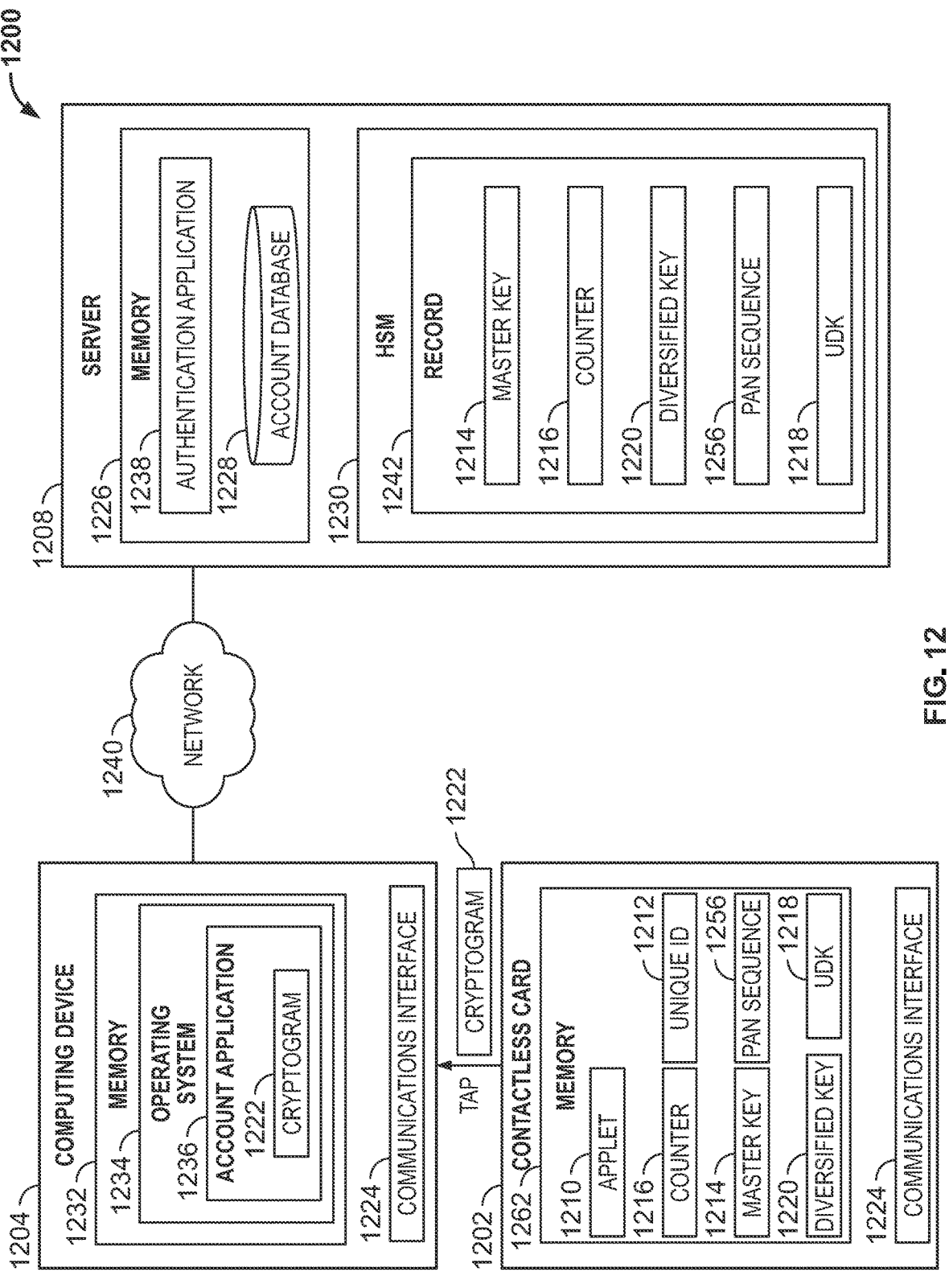
FIG. 12 depicts an exemplary computing architecture in accordance with some embodiments of the present disclosure.

FIG. 12 depicts an exemplary computing architecture 1200, also referred to as a system, consistent with some embodiments of the present disclosure. Although the computing architecture 1200 shown in FIG. 12 has a limited number of elements in a certain topology, it may be appreciated that the computing architecture 1200 may include more or less elements in alternate topologies as desired for a given implementation.

The computing architecture 1200 may include one or more computing devices 1204, one or more servers 1206, and one or more contactless cards 1204. The contactless card 1202 may be or may be the same or similar to the contactless card 102; the computing device 1204 may be the same or similar to the computing device 104; and the server 1208 may be the same or similar to the server 108. The computing device 1204 may be communicably coupled to the server 1208 via network 1240.

As shown in FIG. 12, a memory 1262 of the contactless card 1202 may include an applet 1210, a counter 1216, one or more master keys 1214, one or more diversified keys 1220, a unique ID 1212, a primary account number (PAN) sequence number 1256, and one or more Unique Derived Keys (UDKs) 1218. The unique ID 1212 may be any identifier that uniquely identifies the contactless card 1202 relative to other contactless cards. For example, in some embodiments, unique ID 1212 may be or may include an identifier 1150*a-n*, a member ID 430, a partner ID 432, a customer ID 414, and/or the like. The PAN sequence 1256 may include a counter value stored by the contactless card 1202. The applet 1210 may be or may include executable code configured to perform some or all of the operations described in the present disclosure. The counter 1216 is a value that is synchronized between the contactless card 1202 and server 1208. The counter 1216 may comprise a number that changes each time data is exchanged between the contactless card 1202 and the server 1208 (and/or the contactless card 1202 and the computing device 1204). The counter 1216, master keys 1214, diversified keys 1220, UDKs 1218, PAN sequence 1256, and/or unique ID 1212 are used to provide security in the system 1200 as described in greater detail below.

A memory 1232 of the computing device 1204 may include an instance of an operating system 1234. Non-limiting example operating systems may include the Android® OS, iOS®, macOS®, Linux®, and Windows® operating systems. As shown, the operating system 1234 includes an account application 1236. The account application 1236 allows users to perform various account-related operations, processing transactions, processing membership functions, activating payment cards, viewing account balances, purchasing items, processing payments, and/or the like.

As shown, a memory 1226 of the server 1208 may include an authentication application 1238 and an account database 1228. The account database 1228 generally includes information related to an account holder (e.g., one or more users, card owners, partner members, and/or the like), one or more accounts of the account holder, and one or more contactless cards 1204 of the account. In some embodiments, account database 1228 may include a membership database (for instance, the same or similar to database 1161*a-n*) of a partner entity system (for instance, the same or similar to system 1160*a-n*).

In the embodiment depicted in FIG. 12, the user may tap the contactless card 1202 to the computing device 1204 (or otherwise bring the contactless card 1202 within communications range of the communications interface 1224 of the device 1204). The account application 1236 may then instruct the applet 1210 to generate a cryptogram 1222. The cryptogram 1222 may be generated based on any suitable cryptographic technique. In some embodiments, the cryptogram 1222 may be based on the unique ID 1212 of the contactless card 1202. In some embodiments, the applet 1210 may include the cryptogram 1222 and an unencrypted identifier (e.g., the counter 1216, the PAN sequence 1256, the unique ID 1212, and/or any other unique identifier) as part of a data package including the cryptogram 1222. In at least one embodiment, the data package may be or may include an NDEF file.

In some embodiments, the computing architecture 1200 may be configured to implement key diversification to secure data, which may be referred to as a key diversification technique in the present disclosure. Generally, the server 1208 (or another computing device) and the contactless card 1202 may be provisioned with the same master key 1214 (also referred to as a master symmetric key). More specifically, each contactless card 1202 is programmed with a distinct master key 1214 that has a corresponding pair in the hardware security module (HSM) 1230 of the server 1208. For example, when a contactless card 1202 is manufactured, a unique master key 1214 may be programmed into the memory 1262 of the contactless card 1202. Similarly, the unique master key 1214 may be stored in a record 1242 in the HSM 1230. In some embodiments, the master key 1214 may include an issuer master key or keys and/or a partner master key or keys.

Furthermore, when a given card 1202 is manufactured, a UDK 1218 may be diversified from the master key 1214 via an HSM function that takes, as input, a diversification factor and a reference to the master key 1214 index in the HSM 1230 (e.g., an index to the record 1242). In some embodiments, the diversification factor may be the unique ID 1212 (for instance, a membership identifier 1150*a-n*, customer ID, member ID, and/or the like) and the PAN sequence 1256 of the contactless card 1202. The UDK 1218 may be stored in the contactless card 1202 and the record 1242 of the HSM 1230. The master key 1214 and UDK 1218 may be kept secret from all parties other than the contactless card 1202 and server 1208, thereby enhancing security of the system 1200. Although depicted as being stored in the record 1242, in some embodiments, the counter 1216 and/or the PAN sequence 1256 are not stored in the HSM 1230. For example, the unique ID 1212, counter 1216, and PAN sequence 1256 may be stored in the account database 1228.

In some embodiments, to generate the cryptogram 1222, the applet 1210 may provide the UDK 1218, unique ID 1212, and a diversification factor as input to a cryptographic algorithm, thereby producing a diversified key 1220. In some embodiments, the diversification factor is the counter 1216. In other embodiments, the PAN sequence 1256 is the diversification factor. The diversified key 1220 may then be used to encrypt some data, such as the diversification factor (e.g., the counter 1216 and/or the PAN sequence 1256) or other sensitive data. The applet 1210 and the server 1208 may be configured to encrypt the same type of data to facilitate the decryption and/or verification processing of a cryptogram.

As stated, the UDKs 1218 of the contactless card 1202 and server 1208 may be used in conjunction with the counters 1216 to enhance security using key diversification.

As stated, the counters 1216 comprise values that are synchronized between the contactless card 1202 and server 1208. The counter 1216 may comprise a number that changes each time data is exchanged between the contactless card 1202 and the server 1208 (and/or the contactless card 1202 and the computing device 1204). When preparing to send data (e.g., to the server 1208 and/or the device 1204), the applet 1210 of the contactless card 1202 may increment the counter 1216. The applet 1210 of the contactless card 1202 may then provide the UDK 1218, unique ID 1212, and counter 1216 as input to a cryptographic algorithm, which produces a diversified key 1220 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. Pat. No. 10,581,611, titled "Systems and Methods for Cryptographic Authentication of Contactless Cards," which is incorporated by reference herein in its entirety. In some embodiments, the PAN sequence 1256 is used as input to the cryptographic algorithm instead of the counter 1216 to generate the diversified key 1220, e.g., by encrypting the UDK 1218, unique ID 1212, and PAN sequence 1256.

The applet 1210 may then encrypt some data (e.g., the unique ID 1212, the counter 1216, the PAN sequence 1256, a command, and/or any other data) using the diversified key 1220 and the data as input to the cryptographic algorithm. For example, encrypting the unique ID 1212 with the diversified key 1220 may result in an encrypted unique ID 1212 (e.g., a cryptogram 1222). As stated, the applet 1210 and the server 1208 may be configured to encrypt the same data.

In some embodiments, two diversified keys 1220 may be generated, e.g., based on one or more portions of the input to the cryptographic function. In some embodiments, the two diversified keys 1220 are generated based on two distinct master keys 1214, two distinct UDKs 1218, the unique ID 1212, and the counter 1216 (or the PAN sequence 1256). In such embodiments, a message authentication code (MAC) is generated using one of the diversified keys 1220, and the MAC may be encrypted using the other one of the diversified keys 1220. The MAC may be generated based on any suitable data input to a MAC algorithm, such as sensitive data, the unique ID 1212, the counter 1216, and/or the PAN sequence 1256. More generally, the applet 1210 and the server 1208 may be configured to generate the MAC based on the same data. In some embodiments, the cryptogram 1222 is included in a data package such as an NDEF file. The account application 1236 may then read the data package including cryptogram 1222 via the communications interface 1224 of the computing device 1204.

In some embodiments, cryptogram 1222 may be a membership cryptogram. In various embodiments, cryptogram 1222 may be a transaction cryptogram. In some embodiments, the server 1208 may be a card-issuer server used to process transactions for the contactless card 1202. For example, server 1208 may be a card-issuer server configured to decrypt transaction cryptograms. In various embodiments, the server 1208 may be a partner entity server (for instance, system 1160-*an*) used to process membership functions for the contactless card. For example, server 1208 may be a partner entity server configured to decrypt membership cryptograms.

In some embodiments, the systems and processes described in FIGS. 7-10 and 12 may generate and/or use cryptograms based on different entity master keys and/or card ID information. According to some embodiments, a contactless card may be used for one or more of transaction functions (for example, processing a transaction, purchase, payment, and/or the like typical for a credit card, debit card, and/or the like) and membership functions (for example, applying membership benefits, such as loyalty points, coupons, discounts, purchasing privileges, and/or the like).

In some embodiments, one set of master keys may be used for both financial functions and membership functions. In exemplary embodiments, one cryptogram (for instance, generated using a single set of master keys and a single identifier) may be used for both financial functions and membership functions. In various embodiments, different sets of master keys may be used for financial functions and membership functions. In some embodiments, different unique ID information may be used for financial functions and membership functions.

For example, in various embodiments, a first set of master keys (for example, membership master keys) may be used to generate a first cryptogram (for instance, cryptogram B 718 of FIG. 7 or cryptogram 1222 of FIG. 12) for membership functions and a second set of master keys (for example, issuer master keys) may be used to generate a second cryptogram for transaction functions. For instance, for a purchase, a first cryptogram may be generated and used with a partner back-end system to determine membership information from a partner entity to determine discounts, etc., and the second cryptogram may be generated and used with a card issuer back-end system to process the payment via the card issuer.

In another example, in some embodiments, a single set of master keys may be used with different unique ID information to generate a first cryptogram (for the partner entity) and a second cryptogram (for the card issuer to process the transaction). For instance, the entity master keys may be used with a membership identifier (for example, a member ID of the user with the partner entity) to generate a first cryptogram that may be used by the partner entity to process the membership functions, and the entity master keys may be used with an issuer identifier (for example, a customer or account number of the user with the card issuer) to generate a second cryptogram that may be used by the card issuer to complete the payment process using the contactless card.

Figure 13:
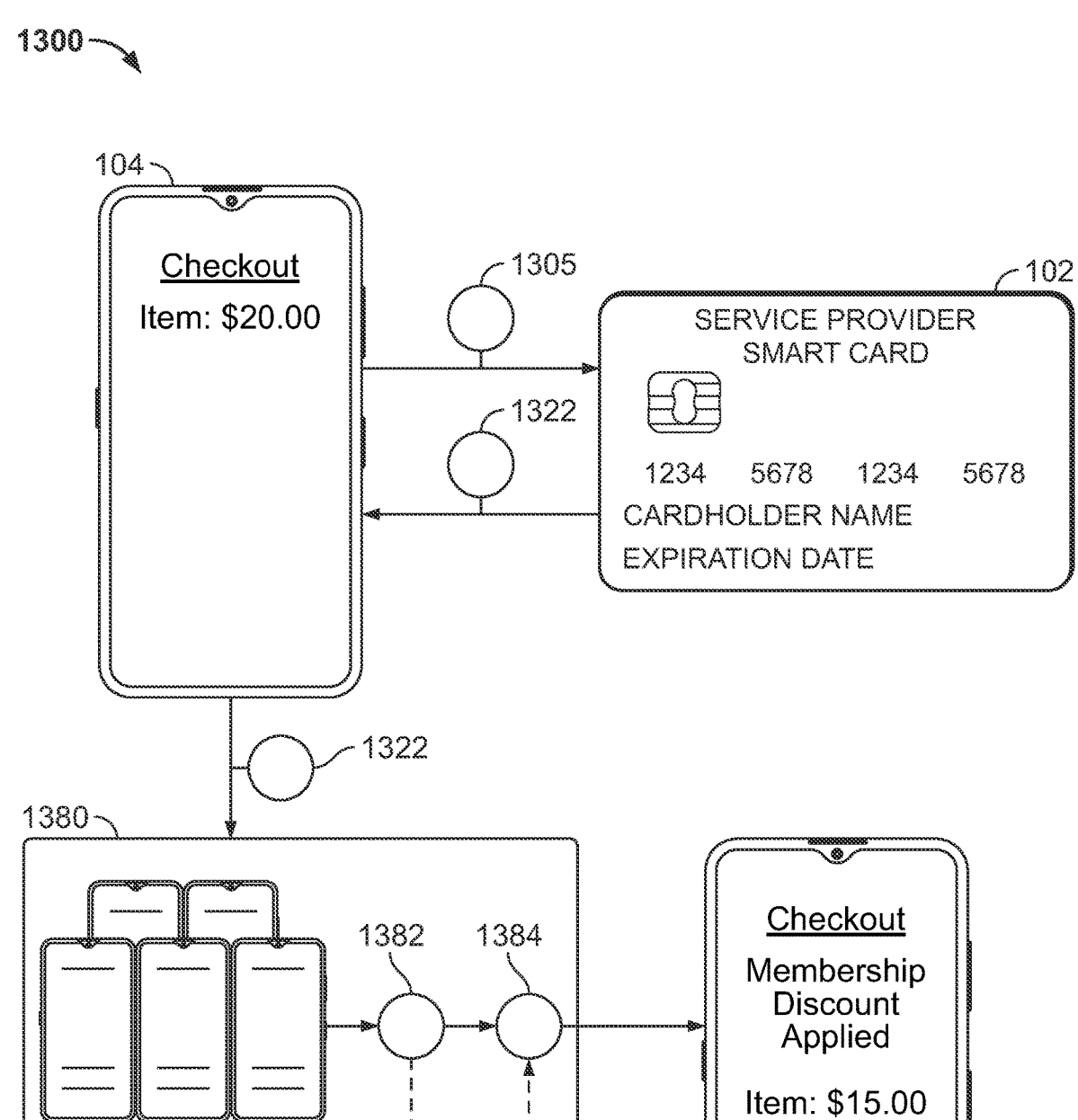
FIG. 13 depicts an exemplary operating environment in accordance with some embodiments.

FIG. 13 depicts an exemplary operating environment in accordance with some embodiments. As shown in FIG. 13, an operating environment 1300 may include a contactless card 102. During a transaction, such as before or during a checkout process, the contactless card 102 may be brought into proximity with a client device 104 to initiate communication between the contactless card 102 and the client device according to some embodiments. The contactless card 102 may determine that a membership process or function is active, for instance, via a transaction signal 1305 sent by the client device indicating a transaction or requesting information from the contactless card 102.

The contactless card 102 may transmit a cryptogram 1322 (for instance, the same or similar to cryptogram 718 or 1222) to the client device. The cryptogram 1322 may be a membership cryptogram, for example, that includes membership information. The membership information may include an identifier 1150*a-n*, a membership identifier, a member ID, a partner ID, and/or any other information associated with a membership with a partner entity that corresponds to the membership function of the transaction. For example, the cryptogram 1322 may include a cryptogram generated using membership master keys (and other elements derived therefrom, such as diversified keys) encrypting membership information (such as an identifier 1150a-n, a member ID, a partner ID, and/or the like).

The cryptogram 1322 may be routed to a back-end system 1380 (for instance, the same or similar to server 108, server 202, server 1208, and/or the like). The cryptogram 1322 may be authenticated 1382 by back-end processing system 1380. In some embodiments, membership information 1384 may be determined from cryptogram 1322, such as a member ID, partner ID, and/or the like encrypted in the cryptogram 1322. In some embodiments, a membership information 1384 may be determined directly from the contactless card 102 (and not from a decryption result of cryptogram 1322). For example, successful authentication 1382 of the cryptogram 1322 may be communicated to the contactless card 102 (for instance, from back-end system 1380, to client device 104, and then to the contactless card 102). The indication of a successful authentication 1382 may cause the contactless card 102 to transmit or release the membership information (e.g., member ID, etc.) to the client device 104, which may then be promulgated to determine member benefits, etc.

In various embodiments, a partner entity back-end system 1360 may be used to determine the membership information 1384, for instance, via a membership database 1361 based on information decrypted in the cryptogram 1322. In exemplary embodiments, the membership information 1384 may include member benefits, such as discounts, rewards, and/or the like. For example, the transaction may be processed to apply a discount for a purchase price. In various embodiments, membership transaction data 1324 may be sent from the client device 104 to the partner entity back-end system 1360 to record the transaction and associated information (e.g., discounts, loyalty points, rewards, etc.).

Included herein are one or more logic flows representative of exemplary methodologies for performing novel aspects of the disclosed embodiments. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by computer executable instructions stored on a non-transitory computer readable medium or machine readable medium. The embodiments are not limited in this context.

FIG. 14 illustrates an embodiment of a logic flow 1400. The logic flow 1400 may be representative of some or all of the operations executed by one or more embodiments described herein, such as the client devices 104, 1104, and/or 1204 and/or servers or back-end systems 108, 202, 1170, 1160a-n, and/or 1208. In some embodiments, logic flow 1400 may be representative of some or all of the operations processing a transaction using a contactless card according to some embodiments.

At block 1402, the logic flow 1400 may receive a membership cryptogram associated with a contactless card during a transaction. For example, a contactless card 102 may transmit a cryptogram 1222 during a transaction facilitated via a client device 104. In some embodiments, the cryptogram may include encrypted membership information, such as a member ID, partner ID, and/or the like. In some embodiments, the cryptogram may be generated using membership master keys associated with a partner entity corresponding to the contactless card.

The logic flow 1400 may decrypt the membership cryptogram at block 1404. For example, the server 1208 may decrypt the cryptogram 1222 using a master key 1214 stored on a HSM 1230 of the server 1208. At block 1406, the logic flow 1400 may authenticate the membership cryptogram. For example, an authentication application 1238 of server 1208 may be used to authenticate the cryptogram 1222. If the cryptogram is authenticated at block 1406, the logic flow 1400 may continue with block 1408.

At block 1408, the logic flow 1400 may determine a membership identifier for the transaction. For example, a membership identifier (for instance, identifier 1150a-n, a member ID, a partner ID, and/or the like) may be included in the cryptogram. Accordingly, the decryption result of decrypting the cryptogram may be used to determine the membership identifier portion. In another example, a successful authentication result may be communicated to the contactless card and, in response, the contactless card may provide the membership information (either in encrypted or non-encrypted form). For instance, the successful authentication of the cryptogram may operate to release or unlock the membership information stored on the contactless card for use in the transaction.

At block 1410, the logic flow 1400 may determine a member of the partner entity based on the membership identifier. For example, the membership identifier may be communicated to the partner entity (or a back-end processing system thereof). The partner entity system may look up the member in a membership database using the membership identifier. Logic flow 1400 may determine membership benefit information for the member at block 1412. For example, the membership benefit information for the determined member may be located in the membership database. The membership benefit information may include benefits, functions, perks, discounts, loyalty or reward points, coupons, and/or the like available to the member. At block 1414, the logic flow 1400 may apply the member benefits for the transaction. For example, a discount may be applied for a purchase, reward or loyalty points may be accrued, and/or the like.

Figure 15:
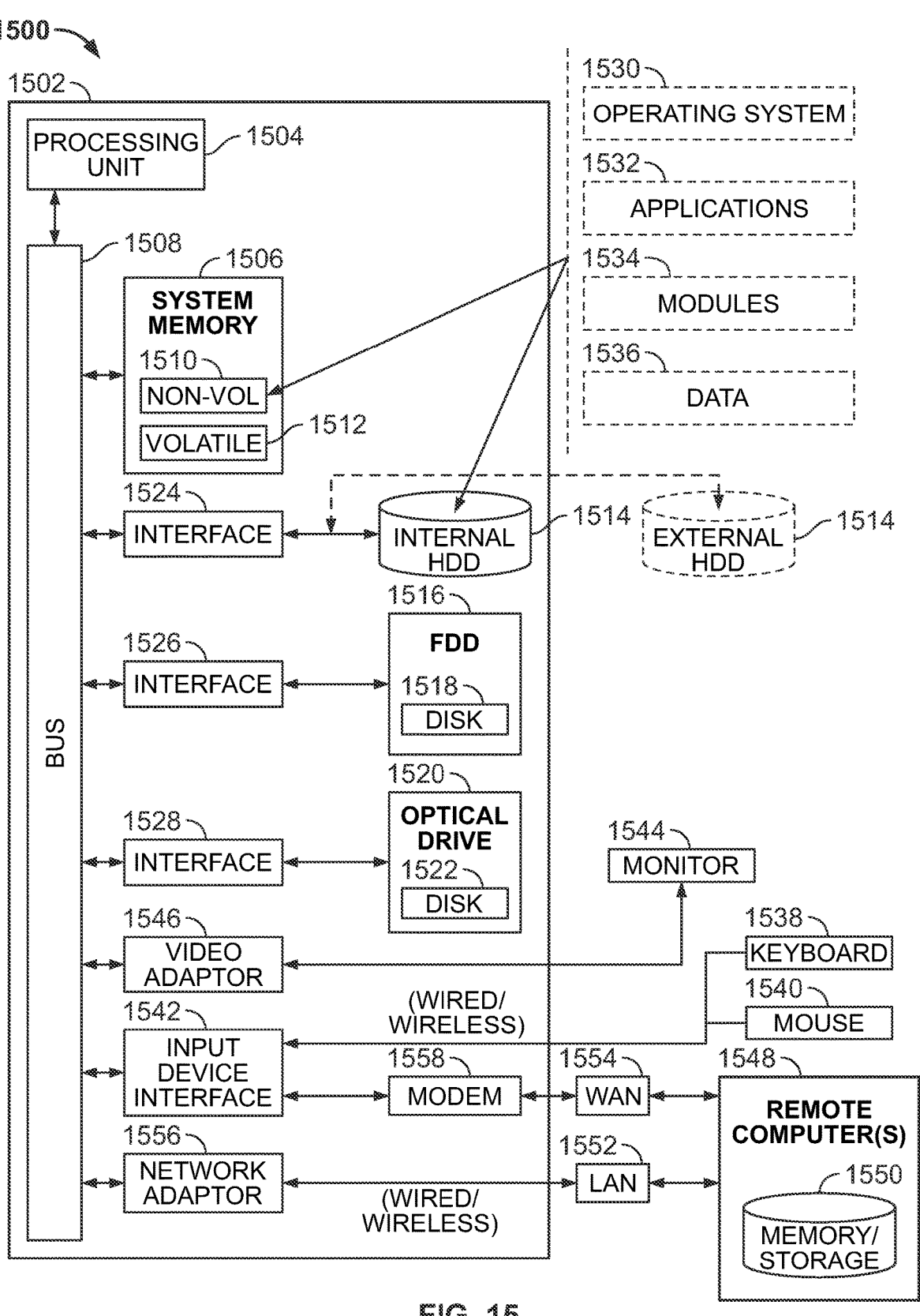
FIG. 15 illustrates an embodiment of an exemplary computer architecture suitable for implementing various embodiments.

FIG. 15 illustrates an embodiment of an exemplary computer architecture 1500 suitable for implementing various embodiments as previously described. In one embodiment, the computer architecture 1500 may include or be implemented as part of computing architecture 100.

As used in this application, the terms "system" and "component" are intended to refer to a computer-related entity, either hardware, a combination of hardware and software, software, or software in execution, examples of which are provided by the exemplary computing computer architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing computer architecture 1500.

As shown in FIG. 15, the computer architecture 1500 includes a computer 1512 comprising a processor 1502, a system memory 1504 and a system bus 1506. The processor 1502 can be any of various commercially available processors. The computer 1512 may be representative of the client device 104 and/or the server 108.

The system bus 1506 provides an interface for system components including, but not limited to, the system memory 1504 to the processor 1502. The system bus 1506 can be any of several types of bus structure that may further interconnect to a memory bus (with or without a memory controller), a peripheral bus, and a local bus using any of a variety of commercially available bus architectures. Interface adapters may connect to the system bus 1506 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 1500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1504 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1504 can include non-volatile 1508 and/or volatile 1510. A basic input/output system (BIOS) can be stored in the non-volatile 1508.

The computer 1512 may include various types of computer-readable storage media in the form of one or more lower speed memory units, including an internal (or external) hard disk drive 1514, a magnetic disk drive 1516 to read from or write to a removable magnetic disk 1518, and an optical disk drive 1520 to read from or write to a removable optical disk 1522 (e.g., a CD-ROM or DVD). The hard disk drive 1514, magnetic disk drive 1516 and optical disk drive 1520 can be connected to the system bus 1506 by an HDD interface 1524, and FDD interface 1526 and an optical disk drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1508, and volatile 1510, including an operating system 1530, one or more applications 1532, other program modules 1534, and program data 1536. In one embodiment, the one or more applications 1532, other program modules 1534, and program data 1536 can include, for example, the various applications and/or components of the system 100.

A user can enter commands and information into the computer 1512 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1502 through an input device interface 1542 that is coupled to the system bus 1506 but can be connected by other interfaces such as a parallel port, IEEE 1394 serial port, a game port, a USB port, an IR interface, and so forth.

A monitor 1544 or other type of display device is also connected to the system bus 1506 via an interface, such as a video adapter 1546. The monitor 1544 may be internal or external to the computer 1512. In addition to the monitor 1544, a computer typically includes other peripheral output devices, such as speakers, printers, and so forth.

The computer 1512 may operate in a networked environment using logical connections via wire and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all the elements described relative to the computer 1512, although, for purposes of brevity, only a memory and/or storage device 1550 is illustrated. The logical connections depicted include wire/wireless connectivity to a local area network 1552 and/or larger networks, for example, a wide area network 1554. Such LAN and WAN networking environments are commonplace in offices and companies, and facilitate enterprise-wide computer networks, such as intranets, all of which may connect to a global communications network, for example, the Internet.

When used in a local area network 1552 networking environment, the computer 1512 is connected to the local area network 1552 through a wire and/or wireless communication network interface or network adapter 1556. The network adapter 1556 can facilitate wire and/or wireless communications to the local area network 1552, which may also include a wireless access point disposed thereon for communicating with the wireless functionality of the network adapter 1556.

When used in a wide area network 1554 networking environment, the computer 1512 can include a modem 1558, or is connected to a communications server on the wide area network 1554 or has other means for establishing communications over the wide area network 1554, such as by way of the Internet. The modem 1558, which can be internal or external and a wire and/or wireless device, connects to the system bus 1506 via the input device interface 1542. In a networked environment, program modules depicted relative to the computer 1512, or portions thereof, can be stored in the remote memory and/or storage device 1550. It will be appreciated that the network connections shown are exemplary and other means of establishing a communications link between the computers can be used.

The computer 1512 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-12 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A system, comprising:

at least one server comprising a processor and a memory storing instructions that, when executed by the processor, cause the processor to:

receive, via a client device, a membership cryptogram generated by a contactless card in communication with the client device during a transaction, the contactless card associated with at least one entity having a plurality of members and the membership cryptogram including membership information associated with the entity;

decrypt the membership cryptogram based on at least one key for the contactless card to determine a decryption result;

authenticate the membership cryptogram based on the decryption result, and responsive to authentication of the membership cryptogram:

determine a membership identifier for the transaction;

determine an entity identifier stored on the contactless card;

route the membership identifier to an entity back-end system identified by the entity identifier;

receive, from the entity back-end system, membership benefit information associated with the membership identifier; and transmit membership benefit information to the client device to facilitate at least one membership function associated with the member for the transaction.

2. The system of claim 1, the membership information comprising a member identifier configured to identify a membership of a contactless card user with the at least one entity.

3. The system of claim 1, wherein the membership cryptogram includes the entity identifier configured to identify the at least one entity.

4. The system of claim 1, wherein the membership benefit information is received from a database of the entity back-end system.

5. The system of claim 1, the entity identifier determined based on the decryption result.

6. The system of claim 1, the at least one key comprising a set of membership keys.

7. The system of claim 1, the at least one entity comprising at least one of a retailer, a shopping club, or a member-based entity.

8. The system of claim 1, the at least one membership function comprising at least one of a discount, a reward, loyalty points, a coupon, a purchase privilege, or historical transaction information.

9. A method, comprising, via at least one server of at least one back-end processing system:

receiving, via a client device, a membership cryptogram generated by a contactless card in communication with the client device during a transaction, the contactless card associated with at least one entity having a plurality of members and the membership cryptogram including membership information associated with the entity;

decrypting the membership cryptogram based on at least one key for the contactless card to determine a decryption result;

authenticating the membership cryptogram based on the decryption result; and responsive to authentication of the membership cryptogram:

determining a membership identifier for the transaction;

determining an entity identifier stored on the contactless card;

routing the membership identifier to an entity back-end system identified by the entity identifier;

receiving, from the entity back-end system, membership benefit information associated with the membership identifier; and transmitting membership benefit information to the client device to facilitate at least one membership function associated with the member for the transaction.

10. The method of claim 9, the membership information comprising a member identifier configured to identify a membership of a contactless card user with the at least one entity.

11. The method of claim 9, wherein the membership cryptogram includes the entity identifier configured to identify the at least one entity.

12. The method of claim 9, wherein the membership benefit information is received from a database of the entity back-end system.

13. The method of claim 9, the entity identifier determined based on the decryption result.

14. The method of claim 9, the at least one key comprising a set of membership keys.

15. The method of claim 9, the at least one entity comprising at least one of a retailer, a shopping club, or a member-based entity.

16. The method of claim 9, the at least one membership function comprising at least one of a discount, a reward, loyalty points, a coupon, a purchase privilege, or historical transaction information.

17. The method of claim 9, the at least one server comprising a card-issuer server and an entity server.

18. A non-transitory computer-readable storage medium, the computer-readable storage medium comprising instructions that, when executed by a processor, cause the processor to:

receive, via a client device, a membership cryptogram generated by a contactless card in communication with the client device during a transaction, the contactless card associated with at least one partner entity having a plurality of members and the membership cryptogram including membership information associated with the entity;

decrypt the membership cryptogram based on at least one key for the contactless card to determine a decryption result;

authenticate the membership cryptogram based on the decryption result; and responsive to authentication of the membership cryptogram:

determine a membership identifier for the transaction;

determine an entity identifier stored on the contactless card;

route the membership identifier to an entity back-end system identified by the entity identifier;

receive, from the entity back-end system, membership benefit information associated with the membership identifier; and transmit membership benefit information to the client device to facilitate at least one membership function associated with the member for the transaction.

19. The non-transitory computer-readable storage medium of claim 18, wherein the membership benefit information is received from a database of the entity back-end system.

20. The non-transitory computer-readable storage medium of claim 18, the at least one entity comprising at least one of a retailer, a shopping club, or a member-based entity.

*     *     *     *     *